United States Patent [19]

Hamane et al.

[11] 4,186,478
[45] Feb. 5, 1980

[54] METHOD OF MANUFACTURING STATORS FOR ELECTRICAL MACHINES OR THE LIKE AND APPARATUS EMPLOYED THEREFOR

[75] Inventors: Tokuhito Hamane, Hirakata; Kinoshita Toshio, Katano; Masafumi Kihira, Osaka, all of Japan

[73] Assignee: Matsushita Electric Industrial Co., Ltd., Osaka, Japan

[21] Appl. No.: 870,082

[22] Filed: Jan. 17, 1978

[30] Foreign Application Priority Data

Jan. 18, 1977 [JP] Japan ................................. 52-4582

[51] Int. Cl.² .......................................... H02K 15/04
[52] U.S. Cl. ................................. 29/596; 29/564.1; 29/606; 29/734; 29/736
[58] Field of Search .................. 29/732, 734, 736, 596, 29/606, 823, 564.1, 564.6

[56] References Cited

U.S. PATENT DOCUMENTS

| | | | |
|---|---|---|---|
| 3,691,606 | 9/1972 | Muskulus | 29/732 |
| 3,742,596 | 7/1973 | Smith et al. | 29/734 X |
| 4,106,185 | 8/1978 | Lauer | 29/596 |

*Primary Examiner*—Carl E. Hall
*Attorney, Agent, or Firm*—Wenderoth, Lind & Ponack

[57] ABSTRACT

A method of manufacturing stators of electrical machines and the like which includes the steps of transporting a plurality of coil inserting jigs by a transporting arrangement for circulating through a transporting path, with the coil inserting jigs receiving coils prepared by winding, and inserting the coils into a stator core, conducting a winding process, an insulating material inserting step for the coil inserting jigs, a coil inserting step for the stator core and an insulating material inserting step for the stator core along the transporting path, and branching and collecting the coil inserting jigs by the transporting arrangement for simultaneously carrying out the coil winding at a plurality of places. An apparatus is also disclosed for efficiently carrying out the above method.

10 Claims, 37 Drawing Figures

METHOD OF MANUFACTURING STATORS FOR ELECTRICAL MACHINES OR THE LIKE AND APPARATUS EMPLOYED THEREFOR

BACKGROUND OF THE INVENTION

The present invention relates to a method of manufacturing stators for electrical machines or the like and an apparatus employed therefor, and, more particularly, to a method of winding electrical coils to be inserted into slots or grooves formed in stators and automatically inserting the wound coils into the grooves of the stator cores by inserting jigs and an apparatus for effecting said method in an efficient manner.

Conventionally, for manufacturing stators of electrical machines and the like, there has been proposed, for example, in U.S. Pat. No. 3,828,830, an apparatus as illustrated in FIG. 1 which generally includes a coil winding device 501, a coil inserting device 502 for inserting wound coils into grooves of stator cores by a coil inserting jig 503, and a rotary table 504 having two coil inserting jigs 503 provided thereon. The coil winding device 501 is equipped with two winding reels 505 disposed at opposite ends of an arm 506, one of which winding reels 505 is arranged in position above the coil inserting jig 503. The other of the winding reels 505 is located above a flyer 507 which winds electrical wires onto the winding reel 505 for producing electrical coils, while the arm 506 is arranged to be rotatable about a shaft 508. By the above arrangement, in the coil winding device 501, the coils produced on the outer periphery of the reel 505 by winding the electrical wires onto said reel 505 by the flyer 507 are brought above the coil inserting jig 503 through rotation of the arm 506. The coils thus preliminarily wound are transferred onto the coil inserting jig 503 as the coil inserting jig 503 descends. Upon completion of transfer of the coils wound around the winding reel 505 onto the coil inserting jig 503, the reel 505 ascends, and is has another coil wound thereon by the flyer 507 after rotation of the arm 506 about the shaft 508. Meanwhile, the particular coil inserting jig 503 which has received the wound coils from the winding reel 505 is transferred to the coil inserting device 502 through rotation of the rotary table 504, with an empty stator core being placed on the coil inserting jig 503, and the coil is inserted into the grooves of the stator core by an extractor (not shown) moving in the direction of the axis of the stator core.

The known apparatus of the rotary table type as described above, however, has disadvantages as follows.

(1) There tends to be a difference between the tact time for the steps from the coil winding to the transfer of the coils onto the inserting jig and the tact time for inserting the wound coils and insulating material into the stator core grooves, thus resulting in an idle-time either at the coil winding device or coil inserting device. Such idle time for the conventional apparatuses currently commercially available is approximately 30 seconds, and further improvement with respect to such idle time is extremely difficult to achieve.

(2) In cases where one winding device disposed on the rotary table is out of order or replacement of the wire material for the coil is required, the whole apparatus must be shut down, with the production being undesirably suspended.

(3) The apparatus of the rotary table type as described in the foregoing can not efficiently cope with changes in production planning for manufacturing stators having different winding characteristics.

In order to overcome the disadvantages as described above, there has also been proposed, for example, in U.S. Pat. No. 3,691,606, another apparatus as shown in FIG. 2. The apparatus shown in FIG. 2 includes a guide track 509 composed of segments which can be added to each other in a length-wise direction, and constituted by a curved rail portion 509a and straight rail portion 509b to form a closed path, transport carriages 510 which move along the guide track 509 and can be arrested at individual production stations arranged along the guide rail 509, a coil winding device 511, and a coil inserting device 512, with the transport carriages 510 being provided with the coil inserting jigs 513. By the above arrangement, in the coil inserting jig 513 of the transport carriage 510 at the position A on the right-hand side of FIG. 2, the stator is inserted, with the coil being received in the stator core, and the stator core is subsequently withdrawn (not shown) from the inserting jig 513. The empty transport carriage 510 moves along the guide rail 509 to a winding station B equipped with the coil winding device 511. Coils equivalent to two poles preliminarily wound on a reel 514 by the coil winding device 511 are simultaneously received by the inserting jig 513 of the transport carriage 510. Subsequently, the transport carriage 510 moves to a stator core inserting station C located next to the winding station B, and after the stator core is inserted onto an upper portion of the coil inserting jig 513, the coil is inserted into the stator core at a coil inserting station D. Thereafter, the transport carriage 510 further moves to return to the original position at the station A. With specific reference to the dotted line portion in FIG. 2, coil winding stations B, C, E, $F_1$ and $F_2$, and $H_1$ and $H_2$ are equipped with winding devices for winding different types of coils. Owing to types of stator core manufacturing, the apparatus is constituted by a group of stations B, C, E, $F_1$ and $F_2$, and G on one hand, and another group of stations $H_1, H_2$ and K on the other hand, while each of the two groups of the stations is adapted to be operable independently. The stations $F_1$ and $F_2$ or $H_1$ and $H_2$ are winding stations for winding the same types of coils in parallel relation, which arrangement makes it possible to manufacture stators for electrical machines, for example, by inserting auxiliary coils into the stator cores at the stations B, E, F and G, and main coils at the stations $H_1$, $H_2$ and K.

The known arrangement as described above, however, also has drawbacks as noted below.

(1) Since a plurality of winding devices are arranged in series in a closed path, the whole apparatus is undesirably shut down if one winding device is stopped, for example, due to trouble for maintenance, for adjustments or for replacement of the winding material.

(2) Since the transport carriage is constructed to incorporate a driving source therein, the cost of the apparatus on the whole is increased.

(3) If the number of the winding devices initially installed is required to be increased later, installation of the additional devices is very difficult.

(4) Since a number of winding reels corresponding to the number of poles of the coil per one winding device are employed, much time and labor are required for replacement of winding reels, for example, following changes of types of electrical machines to be produced.

Accordingly, an essential object of the present invention is to provide a method of manufacturing stators of electrical machines or the like and an apparatus employed therefor in which, in a system having a plurality of winding devices arranged in a closed path for transporting a plurality of coil inserting jigs so as to reduce production time, the winding devices are arranged in parallel to each other to enable branching and recombining of paths of movement of the jigs in order to avoid production shut down of the entire production line in cases where transportation of coil inserting jigs is stopped due to troubles in the winding devices and replacement of winding materials, or during adjustments of the winding devices, with consequent increase of production efficiency over the entire production line.

Another important object of the present invention is to provide a method and an apparatus employed therefor as described above in which a process for cutting and shaping insulating material into pieces corresponding to the number of grooves of the stator core and a process for inserting the insulating material pieces and coils into the stator core are made independent of each other to improve the overall production efficiency, with substantial elimination of disadvantages inherent in the conventional arrangements wherein such processes are effected in one step, requiring a considerable time.

A further object of the present invention is to provide a method and apparatus employed therefor as described above in which the winding devices are adapted to wind coils having a plurality of poles on one winding reel to reduce the time required for changing-over of types of electrical machines to be produced in order to remove the drawbacks in the known arrangements wherein replacement of a plurality of winding reels must be made on a plurality of winding devices during such change-over of product types, with much time and labor required therefor.

A still further object of the present invention is to provide a method and apparatus employed therefor as described above in which coil inserting jigs of simple construction and low cost can be employed, thus making possible a large reduction in cost especially when many inserting jigs are employed, for eliminating the disadvantages in the conventional arrangements that known coil inserting jigs having the driving sources or motors incorporated therein and guided along the guide rail by stopping and running controls are not readily removable when out of order, with consequent high cost.

Another object of the present invention is to provide a method and an apparatus employed therefor as described above in which the tact time for inserting insulating material pieces into a guide housing is reduced, by inserting such insulating material pieces from several places, as compared with the conventional insulating material piece inserting device in which the insulating material pieces are inserted at one place, while the entire apparatus is not shut down in such a case, with only a certain reduction in efficiency, since such insulating material pieces are inserted from other portions into the guide housing even when one portion is out of order.

A still another object of the present invention is to provide a method and an apparatus employed therefor as described above in which inconvenience in the conventional methods and arrangements arising from the fact that carrying out of the coil inserting jigs from the coil winding device tends to be obstructed due to inclination of a pallet because of line pressure applied thereto is advantageously eliminated.

A further object of the present invention is to provide a method and an apparatus employed therefor as described above in which, by depressing stator cores by shifting of a stator core depressing plate in a direction parallel to the axial direction of an insulating material guide, it is possible to hold the stator cores in position irrespective of variations in the thicknesses of the stator cores without any deformation to the insulating material guide.

A still further object of the present invention is to provide an apparatus of the above described type which is accurate and stable in functioning, and which has a simple construction and consequent low cost.

SUMMARY OF THE INVENTION

In accomplishing these and other objects, according to the present invention, there is disclosed a method of manufacturing stators of electrical machines and the like which comprises the steps of transporting a plurality of coil inserting jigs by a transporting arrangement for circulation through a transporting path, with said coil inserting jigs receiving coils prepared by winding and inserting the coils into a stator core, effecting a winding step, an insulating material inserting process for the coil inserting jigs, a coil inserting step for the stator core and an insulating material inserting step for the stator core along said transporting path, and branching and recombining the transporting path of said coil inserting jigs by said transporting arrangement for simultaneously effecting the coil winding at least at a plurality of places. For efficiently carrying out the above described method, there is also disclosed an apparatus for manufacturing stators of electrical machines and the like which comprises a coil winding device, a plurality of coil inserting jigs which receive coils wound by said coil winding device, an insulating material inserting device for inserting insulating material into said coil inserting jigs, a coil inserting device for inserting the coils and pieces of the insulating material into a stator core, and a jig transporting device disposed between said coil winding device, said insulating material inserting device and said coil inserting device for transporting said coil inserting jigs, said jig transporting device being provided with branching means for formation of branched path in which said coil winding devices are transported.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numerals throughout views of the accompanying drawings.

DETAILED DESCRIPTION OF THE INVENTION

Figure 1:
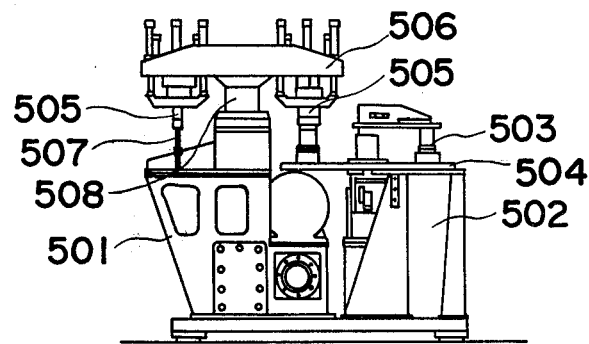
FIG. 1 is a schematic front view showing construction of one conventional stator manufacturing apparatus which has already been referred to, FIG. 2 is a top plan view showing construction of another conventional stator manufacturing apparatus which has also been already referred to, FIG. 3 is a perspective view of a green or unfinished stator which is completed by the present invention.
Figure 2:
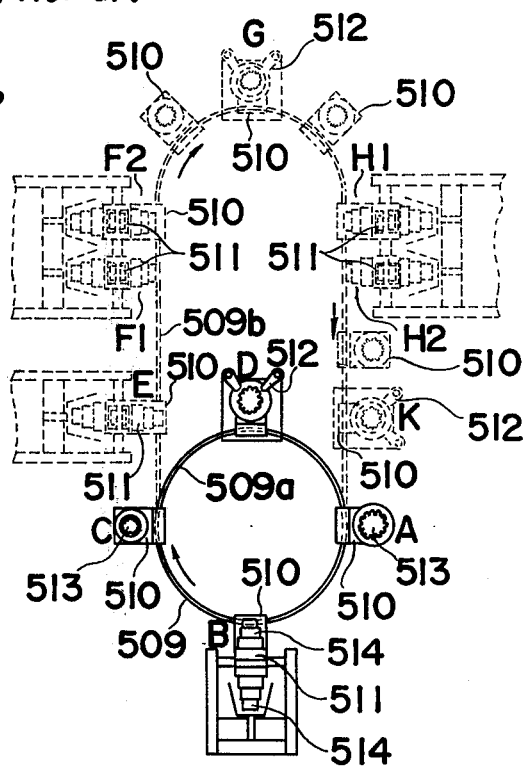
Figure 3:
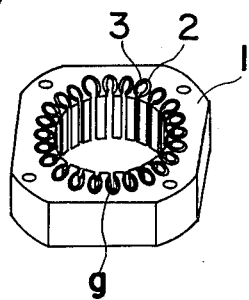
Figure 4:
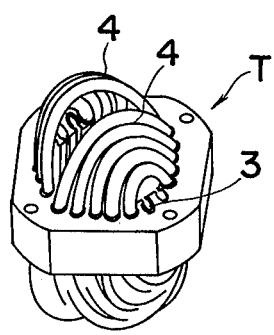
FIG. 4(a) is a perspective view of a finished stator made according to the method and apparatus of the present invention.
FIG. 4(b) is a fragmentary sectional view of a slot of a finished stator as viewed in a direction normal to the axis of the stator.
Figure 4:
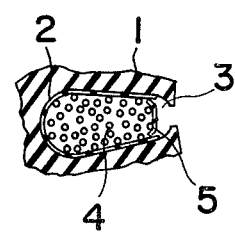

Referring now to the drawings, there is shown in FIGS. 3 to 4(b) a stator T for an electrical machine according to the present invention. The stator T shown in FIG. 4(a) has a construction in which stator coils 4 and pieces of insulating material 5 are inserted into slots or grooves 3 of a grooved portion g formed in a stator core 1 and insulated with a lining of insulating paper 2 as shown in FIG. 4(b).

Figure 5:
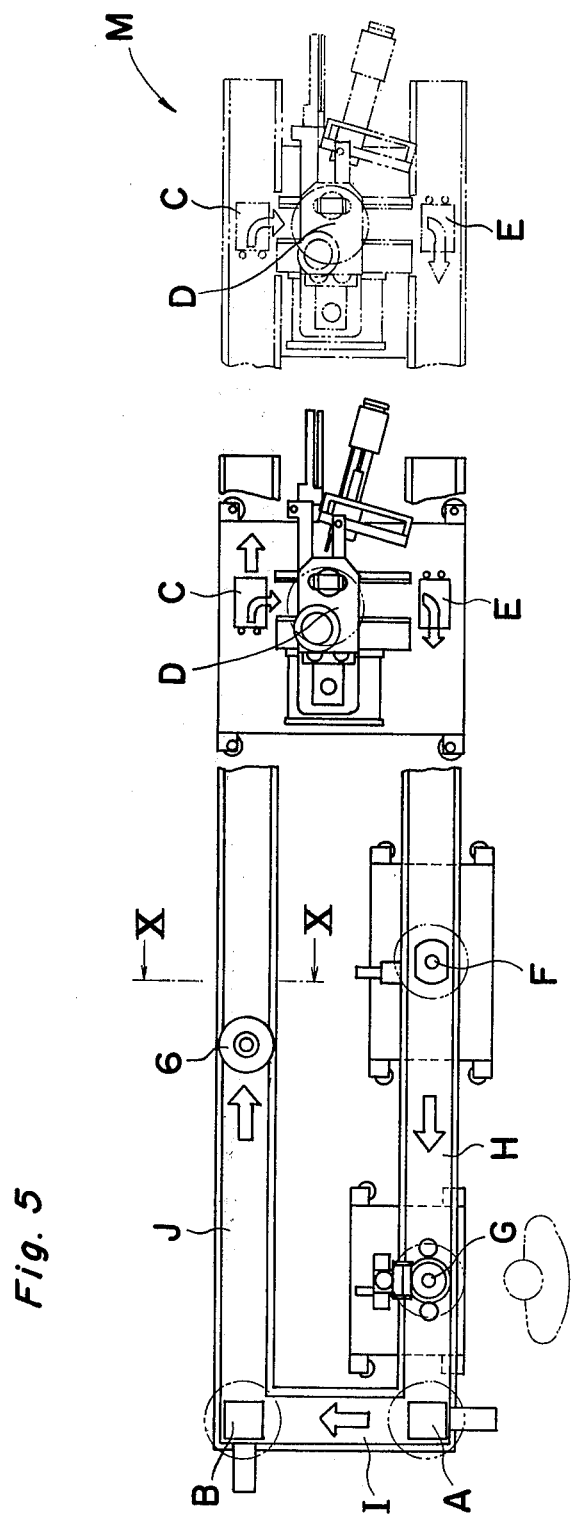
FIG. 5 is a schematic top plan view showing one preferred embodiment of an electrical machine stator manufacturing apparatus according to the present invention.
Figure 6:
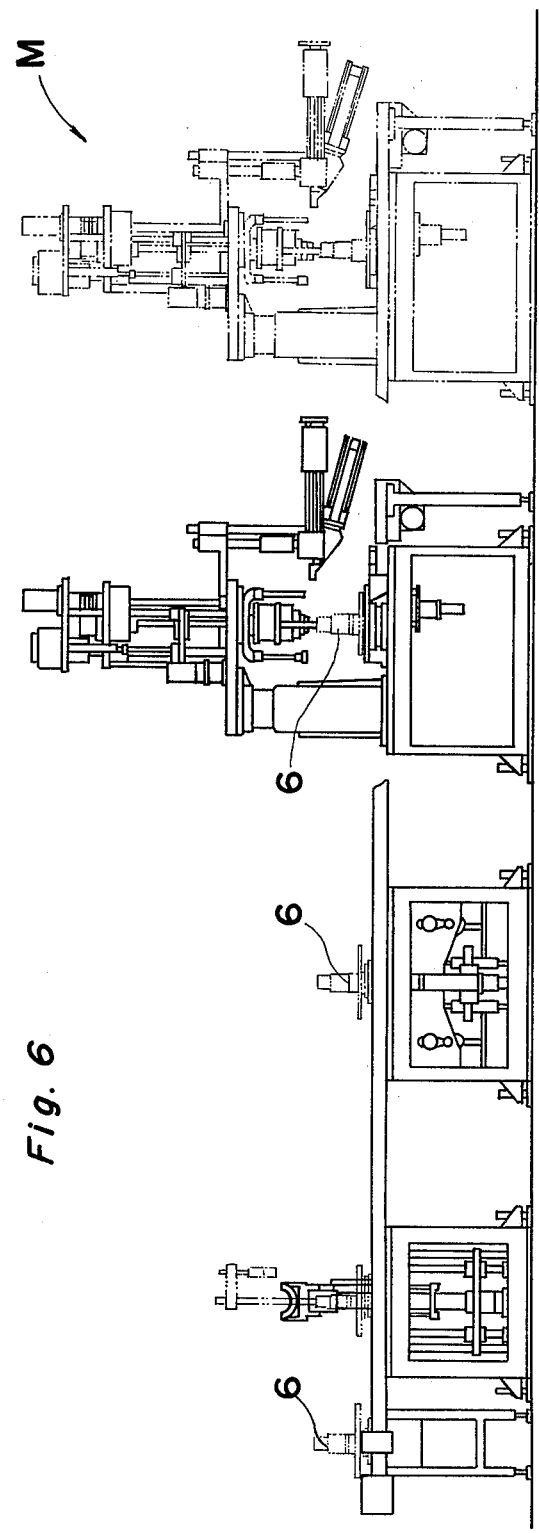
FIG. 6 is a front elevation view of the apparatus of FIG. 5.

Referring also to FIGS. 5 and 6, the general construction of a stator manufacturing apparatus M of the invention is described hereinbelow.

The apparatus M generally includes a stand-by station A for stopping coil inserting jigs described later on a conveyor and changing the advancing direction of the jigs to a direction normal to the direction of movement of the conveyor, a direction changing station B for stopping the coil inserting jigs transported from the stand-by station A and changing the advancing direction of said jigs to a direction the same as the direction of movement of the conveyor, a carrying-in station C for stopping the coil inserting jigs fed from the direction changing station B and feeding these jigs into a winding unit described later in a direction normal with respect to the conveyor, a coil winding station D at which the coil winding unit for forming a coil on the coil inserting jigs fed from the carrying-in station C is located, a carrying-out station E for placing on the conveyor the coil inserting jigs carried out of the coil winding station D, an insulating material inserting station F for inserting insulating material into the lower end of the coil inserting jig fed from the carrying station E, and a coil inserting station G for supplying the stator core and set piece described later to the coil inserting jig fed from the insulating material inserting station F and drawing the coils and insulating material into the stator core.

The construction of each of the above described stations will be explained hereinbelow.

Figure 7:
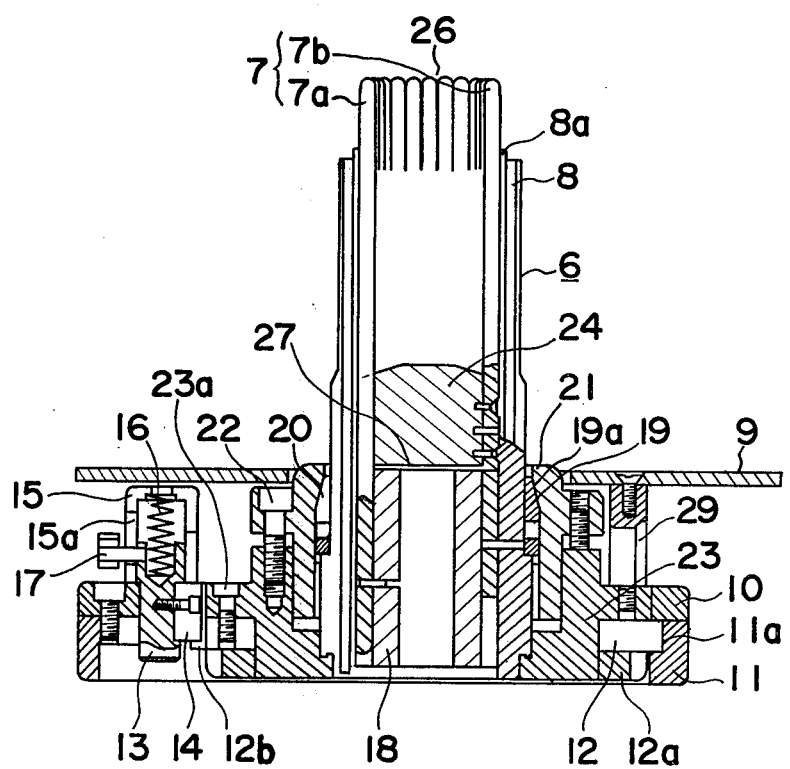
FIG. 7 is a sectional view showing, on an enlarged scale, the construction of a coil inserting jig employed in the apparatus of FIG. 5.
Figure 8:
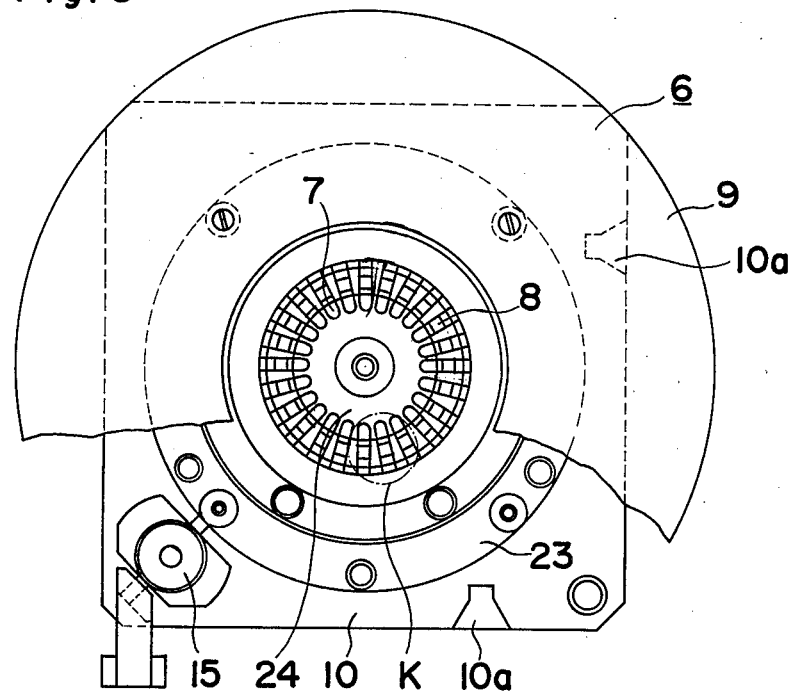
FIG. 8 is a top plan view, partly broken away, of the coil inserting jig of FIG. 7.
Figure 9:
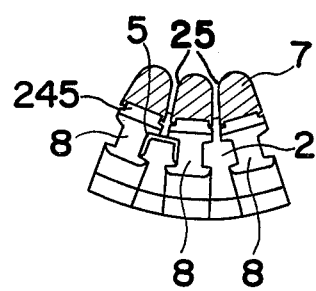
FIG. 9 is a fragmentary top plan view showing, on an enlarged scale, a portion K in FIG. 8.
Figure 10:
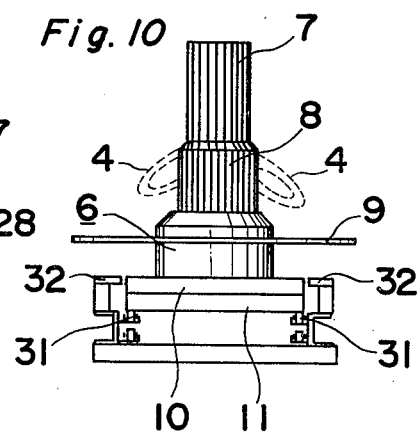
FIG. 10 is a sectional view, on an enlarged scale, taken along the line X—X of FIG. 5.
Figure 11:
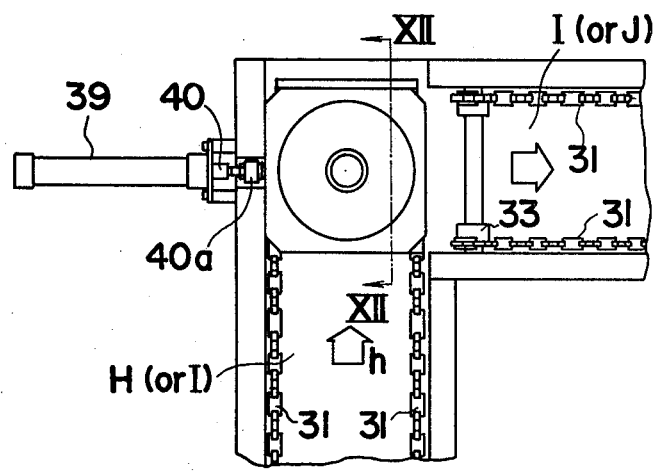
FIG. 11 is a fragmentary top plan view showing, on an enlarged scale, a direction changing device employed in the apparatus of FIG. 5 for changing the direction of transportation of the coil inserting jigs through 90° in a conveyor for transporting the coil inserting jigs.
Figure 29:
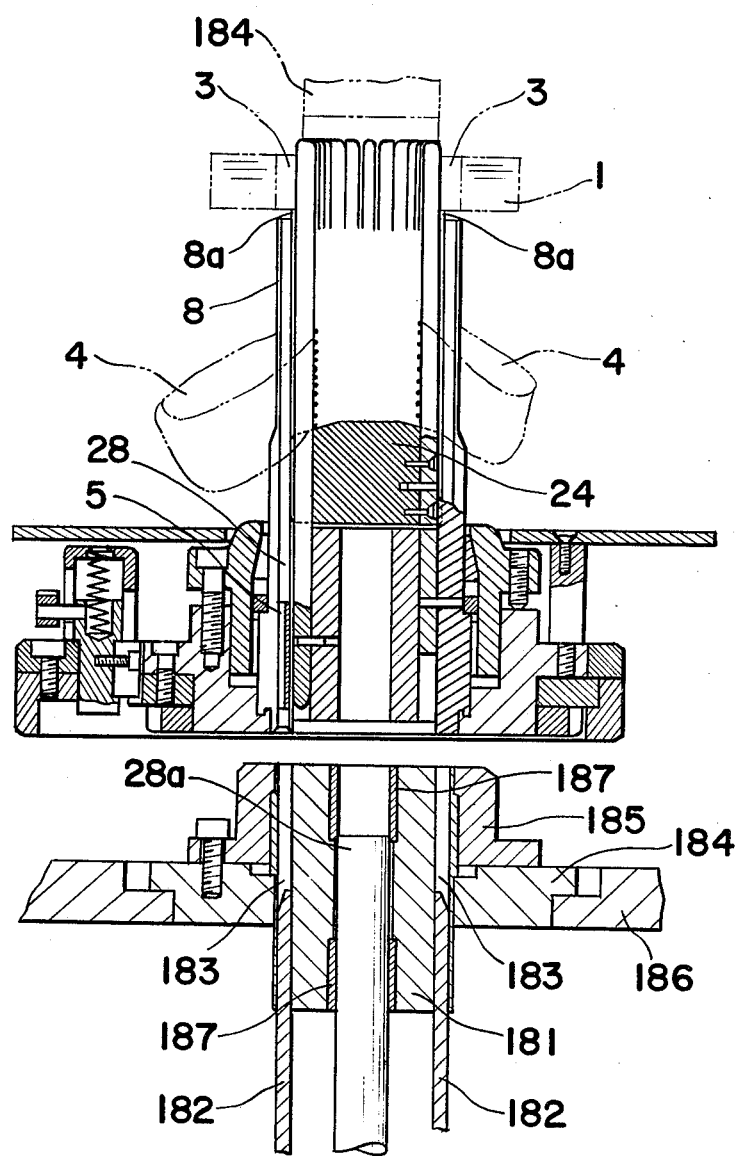
FIG. 29 is a front sectional view, partly in section, showing positional alignment of the coil inserting jig and head portion of the coil inserting device at the coil inserting station G.

Referring also to FIGS. 7 to 9, there is shown, on an enlarged scale, the coil inserting jig 6 employed in the arrangement of FIG. 5 which includes blades 7, insulating material guides 8, coil receiving plate 9, and upper and lower pallets 10 and 11 rotatably supporting the blades 7 and insulating material guides 8 in a manner as described hereinbelow. At a spot-faced portion 11a of the lower pallet 11, a disc 12 is rotatably supported and a gear 12a is fixed to the disc 12, while a key 14 engaging in a key way 12b of the disc 12 is secured to an indexing pin 13. There is also provided a case 15 which is secured to the upper pallet 10 and slidably supports the indexing pin 13, which is urged toward the upper pallet 10 by a compression spring 16. A pin 17 fixed to the indexing pin 13 is guided in a groove 15a formed in the case 15 for preventing the indexing pin 13 from rotating. For retaining the plurality of the blades 7 at equal intervals in the circumferential direction, there is provided a setting block 18 at the lower portion of the blades 7. Fitted over the outer periphery of the insulating material guide 8 is a collet claw 19 having a split groove 20, and a tapered portion 19a formed at the upper end thereof. A depressing ring 21 engages the tapered portion 19a of the collet claw 19, and when the ring 21 is attached to a flange 23 by a bolt 22, the inner diameter of the collet claw 19 is reduced and the insulating material guide 8 and the blades 7 are pressed against the setting block 18 for being secured thereto. The flange 23 is fixed to the disc 12 by a bolt 23a. A coil driving member 24 having coil forwarding portion 25 (FIG. 9) is housed in a coil accommodating space 26 formed within the neighboring blades 7, while a grip portion 27 is provided for attaching the coil driving member 24 to a push-up rod 28a (FIG. 29) described later. The coil driving member 24 is guided for vertical movement by the blades 7 in the axial direction of the array of blades 7. The blades 7 are constituted by long stationary blades 7a secured to the setting block 18 and short movable blades 7b fixed to the coil driving member 24. Coil forwarding portions 25 are between blades 7a and 7b. Between the neighboring insulating material guides 8, there are formed insulating material guides 28 (FIG. 9), and a connecting rod 29 has the upper end thereof fixed to the coil receiving plate 9 and has the lower end fixed to the flange 23.

Referring also to FIGS. 10 to 13, the method of transporting the coil inserting jigs 6 will be described hereinbelow.

The pallet 11 is supported by a pair of chains 31, while the pallet 10 is guided as it is moved by the chains by a guide 32 extending along the chains 31. At the opposite ends of the conveyor, there are rotatably disposed sprockets 33 around which the chains 31 are directed, with one of the sprockets 33 being coupled to a shaft of a motor (not shown) for being supplied with driving force for driving the chains 31. The conveyors H, I and J as described above are sequentially arranged as shown in FIG. 5.

Figure 12:
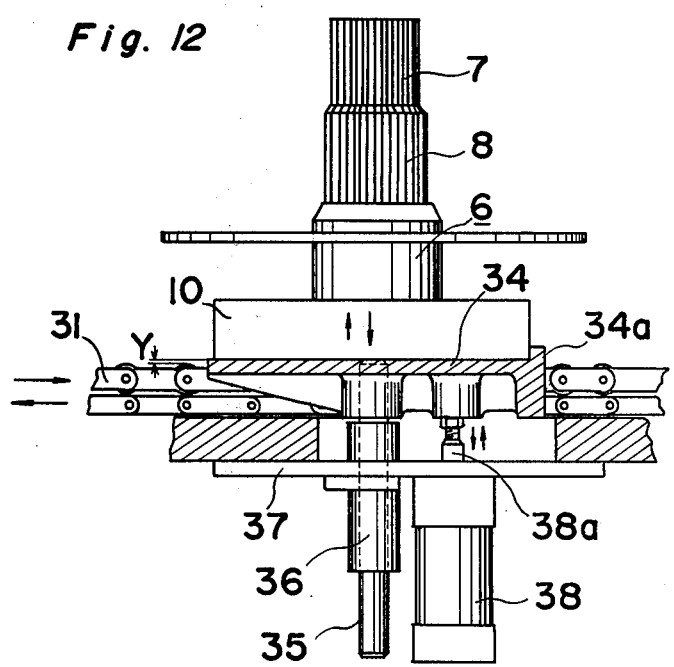
FIG. 12 is a sectional view taken along the line XII—XII of FIG. 11.

Referring particularly to FIG. 12, the construction of the stand-by station A will be explained hereinbelow.

At the stand-by station A, there is provided an elevating plate 34 having a contact portion 34a for preventing the advance of the pallet 10 of the coil inserting jig 6, a shaft 35 fixed to the elevating plate 34, and a guide 36 supported by a main body plate 37 for guiding the shaft 35. For vertical movement of the elevating plate 34, a hydraulic cylinder 38 is provided which has a piston rod 38a engaging the underside of plate 34. The elevating plate 34 is disposed in such a position that, upon raising the coil inserting jig 6 on the elevating plate 34 by operation of the cylinder 38, the under surface of the pallet 10 is located above the upper surface of the chains 31 a distance Y, while upon retraction of the rod 38a into the cylinder 38, only the contact portion 34a of the elevating plate 34 is above the upper surface of the chains 31. At the end portion of the conveyor H, there is disposed a hydraulic cylinder 39 for changing the direction of movement of the jig 6 and which is actuable in a direction normal to the forwarding direction h, and at one end of the rod 40 of the cylinder 39, there is disposed a pressing piece 40a.

Since the direction changing station B has a similar construction to that of the stand-by station A, a detailed description thereof is omitted for brevity.

Figure 13:
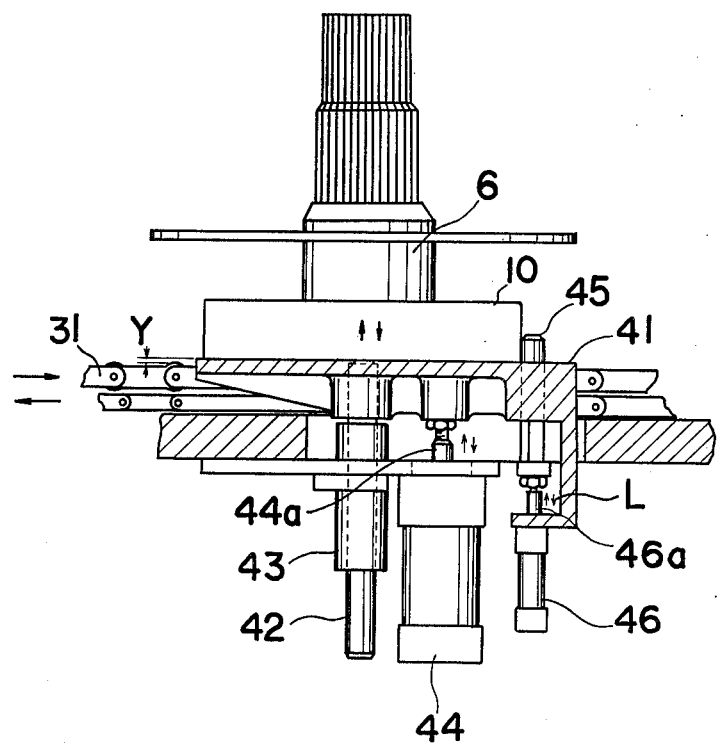
FIG. 13 is a side sectional view taken along the line XIII—XIII of FIG. 14 described later and showing construction of a device employed in the apparatus of FIG. 5 for vertically moving the coil inserting jig at a carrying-in station C or carrying-out station E and for stopping the said jig on the conveyor.

Referring also to FIG. 13, the construction of the carrying-in station C will be explained hereinbelow.

The carrying-in station C includes an elevating plate 41 having a guide shaft 42 journalled in a bearing 43 and fixed to the lower portion of the plate 41 for raising the coil inserting jig 6 which has reached the carrying-in station C from the upper surface of the chains 31, a hydraulic cylinder 44 for driving the elevating plate 41 in vertical movement by means of the rod 44a, a stop pin 45 provided on the elevating plate 41 for movement in a direction indicated by arrows L within the plate 41, and another hydraulic cylinder 46 for vertically sliding the stop pin 45 by the advancing and retraction of the rod 46a of the cylinder 46. When the elevating plate 41 is located below the upper surface of the chains 31, the forward end of the stop pin 45 is located above the upper surface of the chains 31. It is also possible to position the forward end of the stop pin 45 below the upper surface of the chains 31 by retracting the rod 46a of the cylinder 46. After stopping the coil inserting jig 6 by the stop pin 45, the elevating plate 41 is raised through the distance Y from the upper surface of the chain by the advancing of the rod 44a of the cylinder 44 to lift the coil inserting jig 6 for standing-by and subsequent carrying-in into the coil winding station D.

Figure 14:
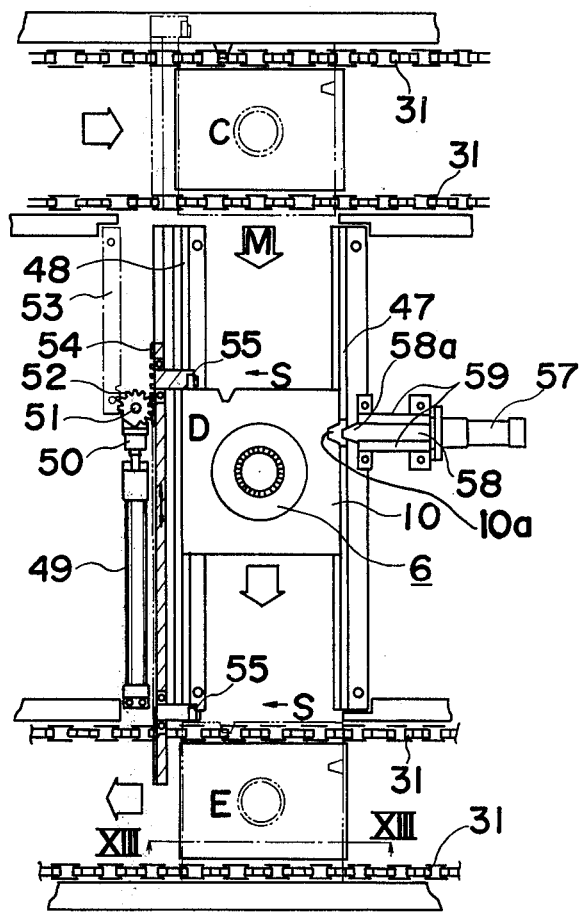
FIG. 14 is a top plan view of a device employed in the apparatus of FIG. 5 for transporting the coil inserting jig to the carrying-in station C, coil winding station D and carrying-out station E.
Figure 15:
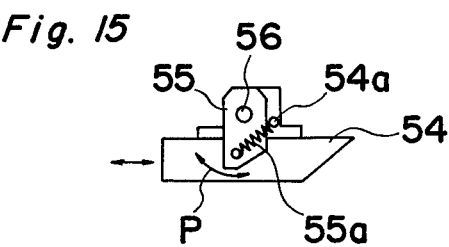
FIG. 15 is a fragmentary front elevational view showing, on an enlarged scale, the construction of a feeding claw section as viewed in a direction shown by the arrow S in FIG. 14.

Referring also to FIGS. 14 and 15, the method of carrying-in is described hereinbelow. In FIG. 14, there are provided jig guides 47 and 48 for guiding the pallet 10 of the coil inserting jig 6 during the sliding of the coil inserting jig 6, and a hydraulic cylinder 49 is also provided for moving the pallet 10 in the direction indicated by the arrow M or in a direction opposite to that of the arrow M (FIG. 14). At the end of the rod of the cylinder 49, a block 50 is fixed, and a shaft 51 is housed in the block 50 and on which a gear 52 rotates. The gear 52 engages a fixed rack 53 on one side of the path of movement of block 50 and movable rack 54 on the other side, the rack 54 having a claw 55 incorporated therein, the claw 55 being pivotally supported on a pin 56 fixed to the rack 54, and is normally urged in the direction indicated by the arrow P (FIG. 15) by a spring 55a so as to contact a stop pin 54a. When the rack 54 is shifted to the carrying-in station C by the actuation of the cylinder 49, the claw 55 contacts the pallet 10, and pivots about the pin 56 against the force of the spring 55a to ride over the pallet 10, and after reaching an end portion of the pallet 10, comes into contact with said end portion. Subsequently, when the rack 54 is moved toward the winding station D, the claw 55 is prevented from pivoting by the stop pin 54a and drives the pallet 10 in the direction indicated by the arrow M in FIG. 14 for carrying the jig 6 to the coil winding station D. In this case, if any coil inserting jig 6 which has already been transported is present at the winding station D, such a jig 6 is carried simultaneously by the claw 55 to the carrying-out station E. Subsequently, the rack 54 having the claw 55 thereon is returned to the original position before entering the conveyors J and H.

With particular reference to FIG. 14, the construction of the coil winding station D will be explained hereinbelow.

The coil winding station D includes a hydraulic cylinder 57 for driving a regulating member 58 having a V-shaped projection 58a at its one end, and also a guide 59. Upon advancing of the cylinder 57 for driving the regulating member 58, the projection 58a of the regulating member 58 engages a V-shaped groove or recess 10a in the pallet 10, with the pallet 10 being pressed against the guide 48 to regulate the position of the pallet 10 for the coil inserting jig 6.

The following description is related to coil winding and coil inserting functions with respect to the coil inserting jig 6 regulated in the above described manner.

Figure 16:
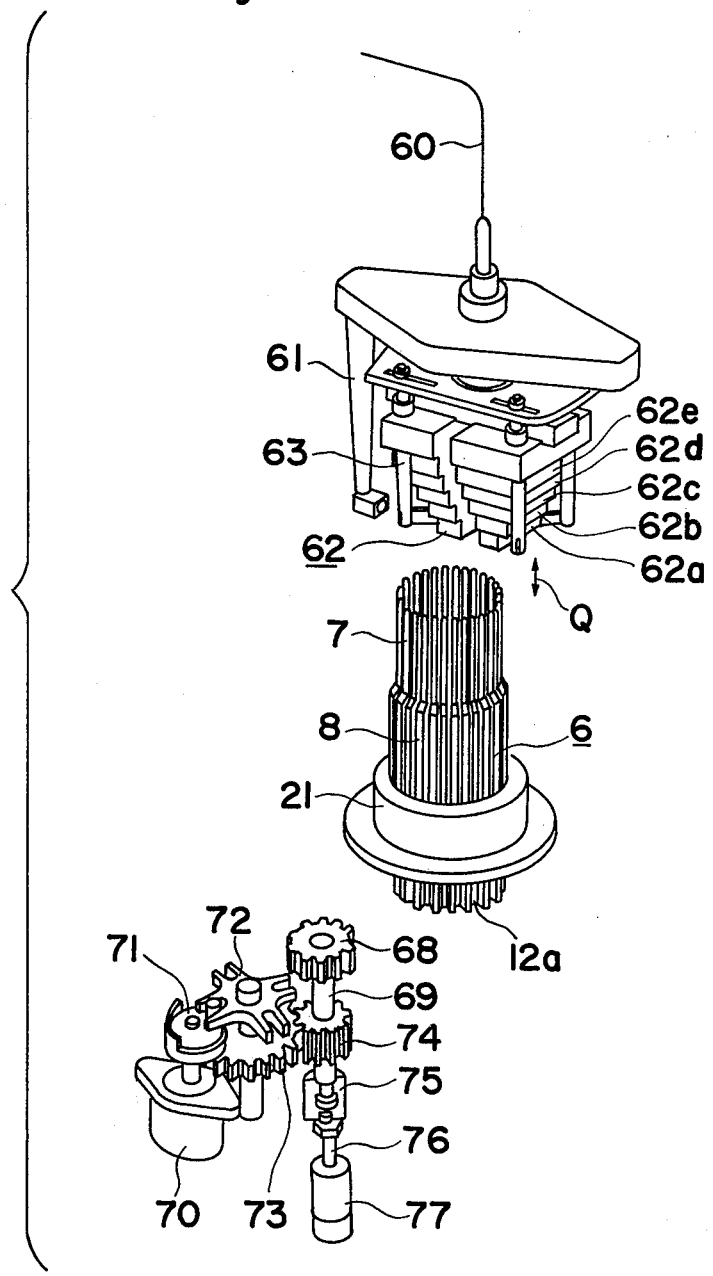
FIG. 16 is an exploded view showing, on an enlarged scale, construction of a winding section of the coil winding device and an index portion of the coil inserting jig employed in the apparatus of FIG. 5.
Figure 17:
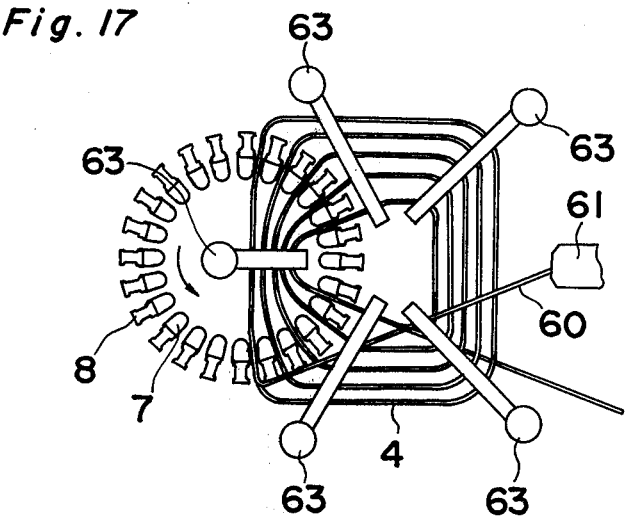
FIG. 17 is a schematic top plan view showing the relation of the coil inserting jig and winding reel upon completion of winding of a coil for a first pole.
Figure 18:
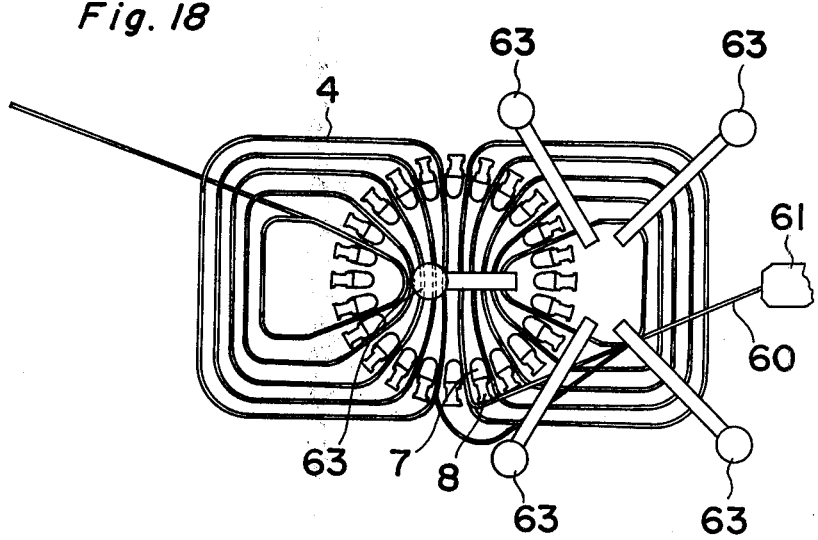
FIG. 18 is a similar view to FIG. 17, but particularly shows the relation of the coil inserting jig and winding reel upon completion of winding of another coil for a second pole.

Referring to FIGS. 16 to 18, the electric wire 60 extending through a flyer 61 is held at one end thereof by a cutting device (not shown), while there is provided a winding reel 62 divided into several stages 62a, 62b, 62c, 62d and 62e are provided with openings for insertion of the blades 7 therethrough. Also provided is a coil pushing rod means 63 which moves vertically in the directions indicated by the arrows Q (FIG. 16) following rotation of the flyer 61.

By the above arrangement, coils each constituting one pole are wound starting with the coil having the smallest size. Then the reel 62 is lowered until the stage 62a thereof for the smallest coil enters the forward end of the blades 7 a suitable distance, and subsequently, the coil pushing rod means 63 moves vertically in the direction of the arrows Q in FIG. 16. By this operation, the coil wound on the winding reel 62a successively moves downwards so as to be dropped into the coil accommodating space 26 of the coil inserting jig 6 described earlier. Next the coil winding for the second stage of the coil is effected, in which case, in the similar manner as in the winding of the coil for the first stage, the winding reel 62 is lowered until the second stage 62b thereof enters the corresponding forward end of the blades 7 the predetermined distance, and the coils wound with a predetermined number of turns are successively dropped into the blades 7.

In the manner as described above, winding is sequentially effected onto the third, fourth and fifth stages 62c, 62d and 62e for the predetermined number of stages for completing winding of one pole, and after completion of winding of the predetermined number of stages and turns, all the wire remaining on the reel for each of the stages is dropped into the insulating material guides 8 by lowering the coil pushing rod means 63. In the next step, to wind coils for the subsequent poles, the blades 7 and insulating material guides 8 are rotated, for example, through 180° for two poles and 90° for four poles for winding of the coils for the subsequent poles in a similar manner.

Still referring to FIG. 16, there will be described the rotating mechanism for the blades 7 and insulating material guides 8 in the coil inserting jig 6.

The rotating mechanism is located at the lower portion of the winding station D and includes a driving gear 68 rotatably supported on a shaft 69 and in mesh with the gear 12a secured to the disc 12 provided on the coil inserting jig 6, a driving motor 70 the rotation of which is transmitted to the driving gear 68 through an arm 71, a wheel 72, a gear 73, a gear 74 and a shaft 69, and a coupling 75 rotatably supporting the shaft 69 and coupled to a hydraulic cylinder 77 through a rod 76.

By the above arrangement, for rotation of the blades 7, first the shaft 69 is caused to rise by the cylinder 77, which also causes the gear 68 to engage the indexing pin 13 (FIG. 7) of the coil inserting jig 6 to raise it against the force of the spring 16, and also causes the key 14 to be disengaged from the key way 12b, and brings the disc 12 into a freely rotatable state, and the driving gear 68 engages the gear 12a. Upon rotation of the motor 70, the disc 12 as well as the blades 7 start rotating. It is to be noted here that angle through which the disc 12 is rotated can be varied by proper selection of gear ratio of the gears 73 and 74. When the rotational positioning of the disc 12, i.e., blades 7 is completed, the hydraulic cylinder 77 is actuated to lower the shaft 69 and pin 13, and the disc 12 is again fixed by the key 14.

Upon completion of the coil winding and insertion of the coil into the coil inserting jig 6, the regulating member 58 is retracted from the V-shaped recess 10a of the pallet 10, and the pallet 10 is thus released. Subsequently, the hydraulic cylinder 49 is actuated, and the coil inserting jig 6 is transported from the coil winding station D to the carrying-out station E by the claw 55 provided on the rack 54. In this case, if a subsequent coil inserting jig 6 is standing-by at the carrying-in station C as described earlier, such a coil inserting jig is simultaneously carried into the coil winding station D and the coil winding operation is repeated. In the carrying-out station E, there is provided an arrangement similar to that in the carrying-in station C described earlier. As the coil inserting jig 6 moves onto the elevating plate 41 standing-by in a raised state, the rod of the hydraulic cylinder 44 retracted, and the elevating plate 41 is lowered to lower the jig 6 onto the chains 31 of the conveyor H for being transported to the insulating material inserting station F.

The construction of the insulating material inserting station F will be described hereinbelow.

Referring to FIGS. 19 to 28, showing the insulating material inserting station F, there is provided guides 80 and 109 for guiding the pallet 10, a stop plate 81 pivotally supported by a pin 82, a projecting piece 81a at the forward end of the stop plate 81 extending into the path of the jig 6 for stopping the pallet 10 of the coil inserting jig 6 as it comes out of the guide 80, a link 83 connected at one end thereof to a solenoid 84 and at the other end thereof to the stop plate 79, a regulating member 86 having a zigzag or winding cam groove in the lower surface thereof and a V-shaped projection 86a at the forward end thereof, a guide member 87 for guiding the regulating member in its sliding movement cylinder 89 having the rod connected to the regulating member 86 through a joint 90, a guiding block 91 and rack 92 positioned on the lower surface of the regulating member 86, and a roller 93 secured to the upper surface of the rack 92 and contacting the inside of the cam groove of the regulating member 86. At each end of the rack 92 is a gear 94 engaging the teeth of the rack 92, a gear 95, a shaft 96 on which the gear 94 and gear 95 are mounted, a bearing 97 fixed to the under surface 80a of the guide 80 and supporting the shaft 96, another bearing 99 supporting the shaft 96 on the same axis as the bearing 97 so that the shaft 96 supported by the bearings 97 and 99 rotates freely, a cam shaft 100 which is supported by bearings 101 and 102 secured to the stationary plate 98 parallel to the shaft 96 and having a gear 103 (FIG. 21) at one end in engagement with the gear 95, and a cam 104 secured to the cam shaft 100. Bearings 101 and 102 have levers 105 pivotally mounted thereon by shafts 107 respectively, with each of the levers 105 being provided at its opposite ends with rollers 108, the roller 108 at one end of each of the levers 105 contacting the cam 104 of the cam shaft 100.

Figure 19:
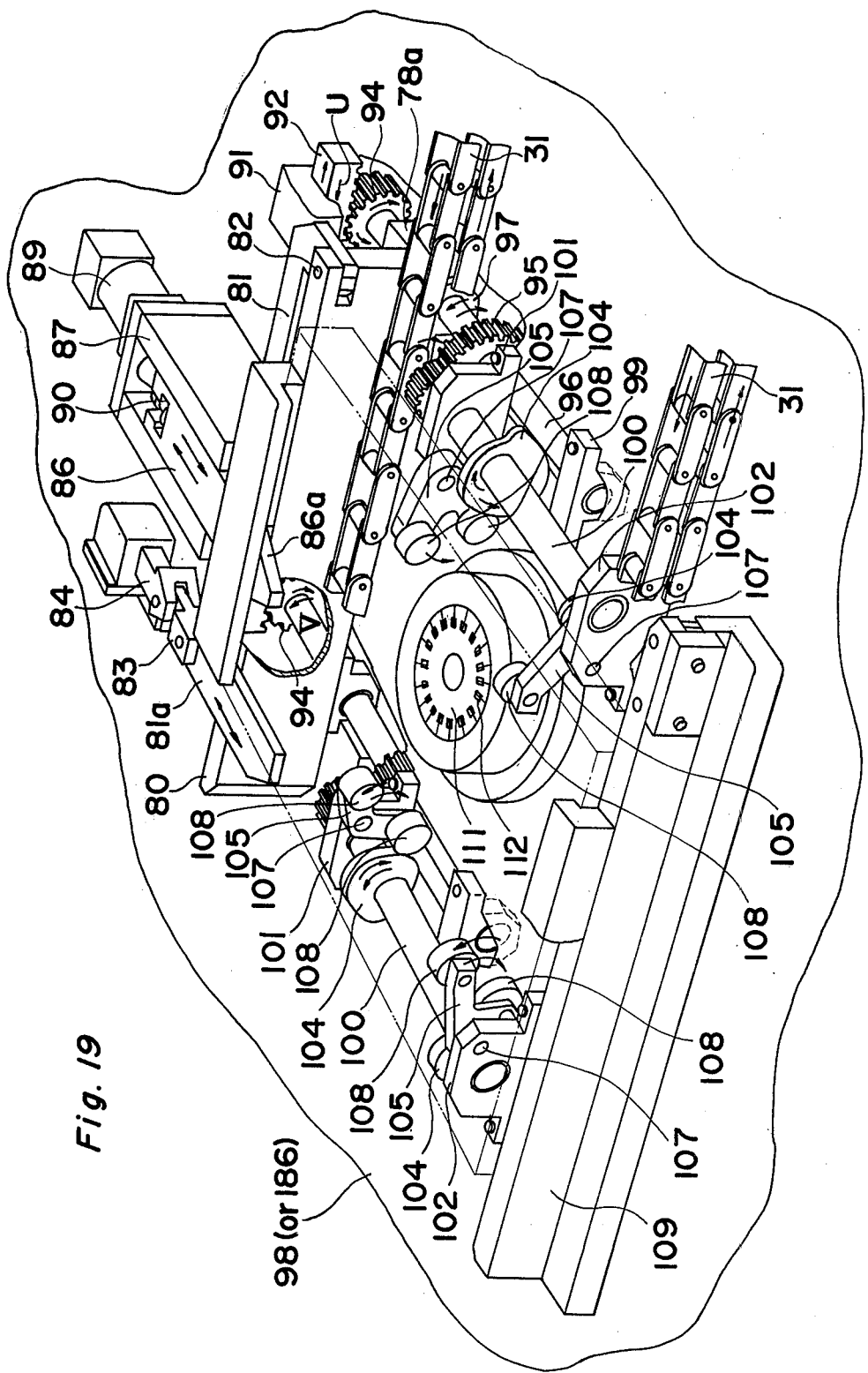
FIG. 19 is a perspective view, showing on an enlarged scale, construction of a position regulating device for the coil inserting jig at the insulating material inserting station F and the coil inserting station G.
Figure 20:
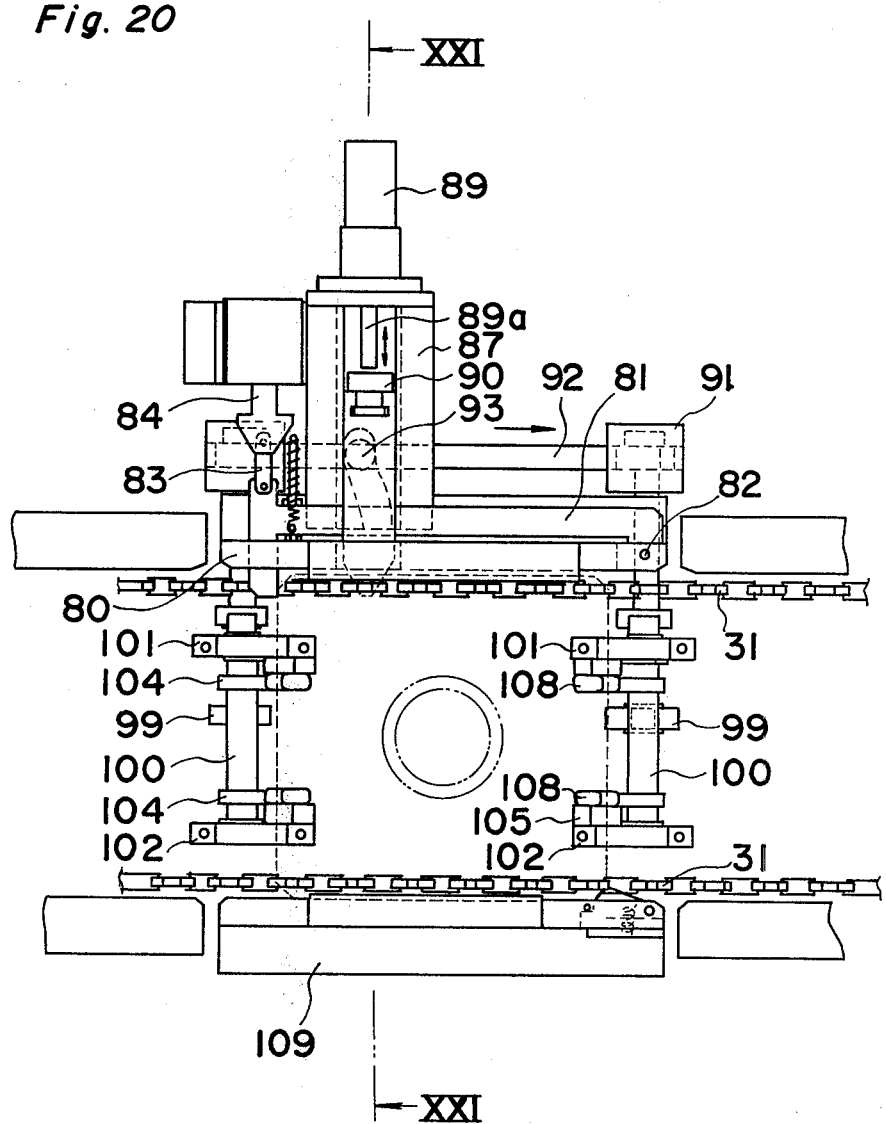
FIG. 20 is a top plan view of the position regulating device of FIG. 19.
Figure 21:
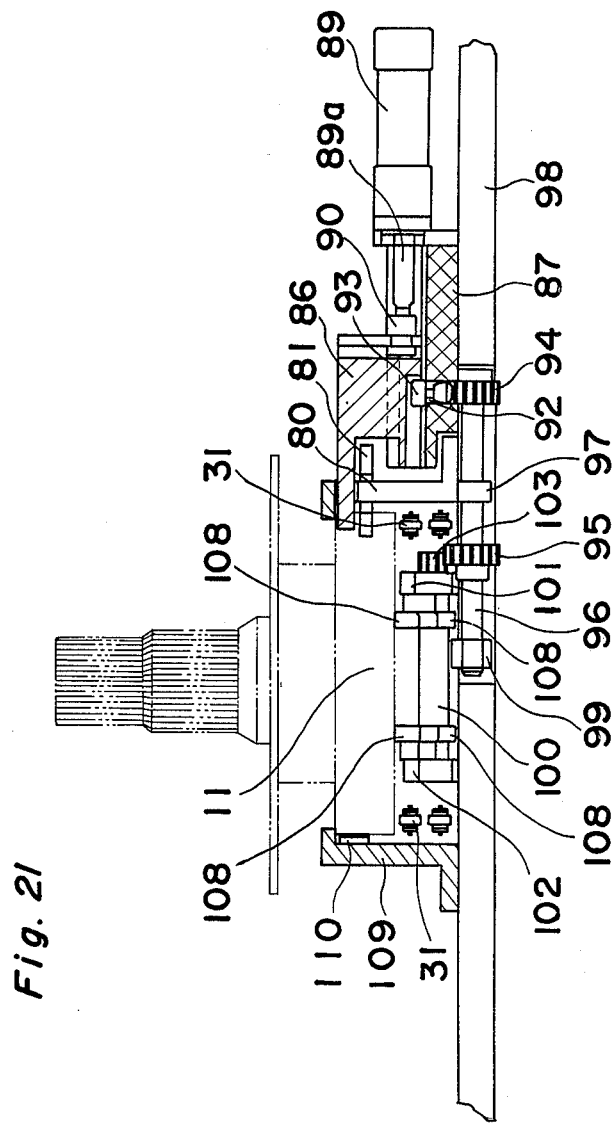
FIG. 21 is a cross sectional view taken along the line XXI—XXI of FIG. 20.
Figure 22:
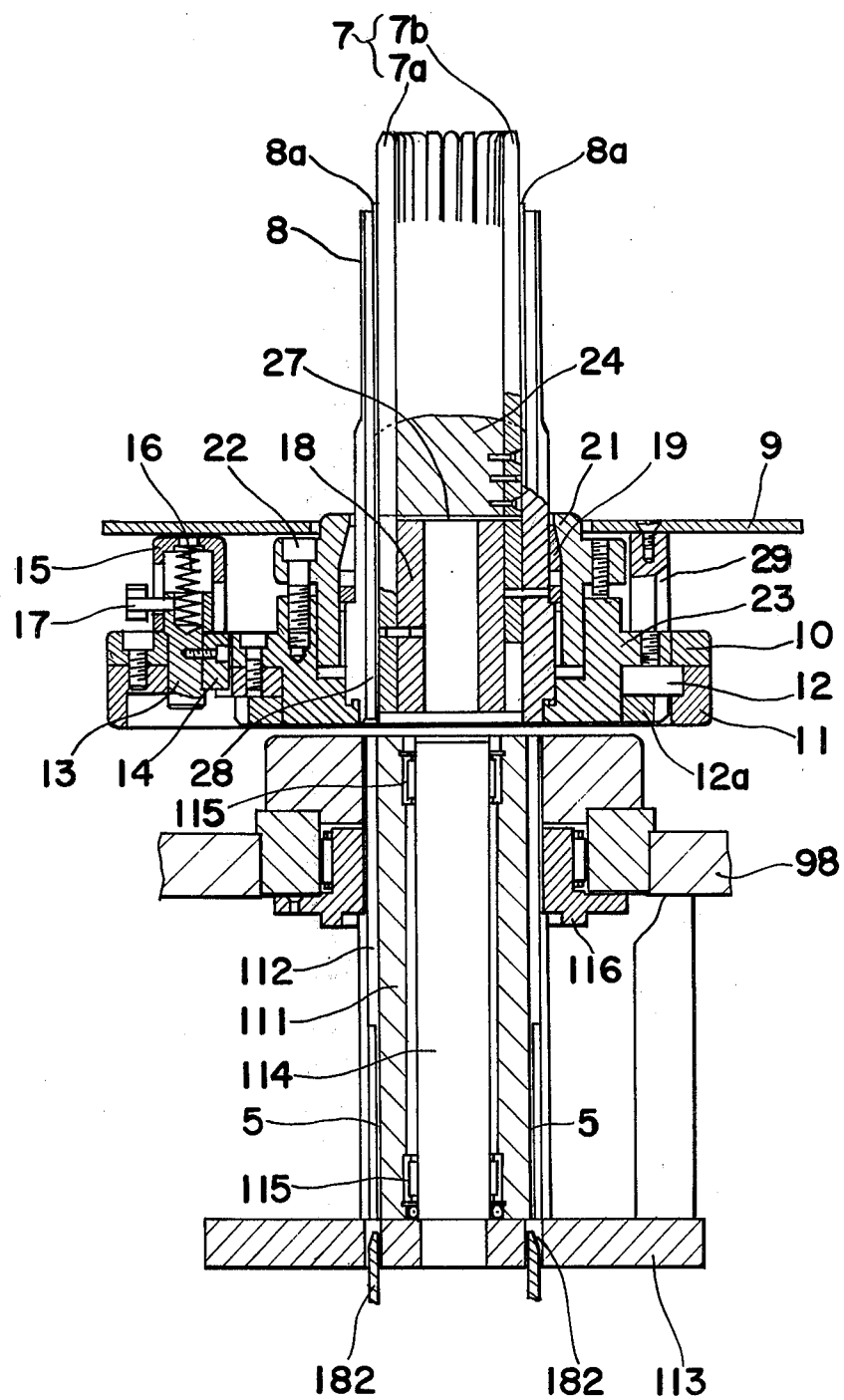
FIG. 22 is a front sectional view, partly in section, explanatory of positional alignment of the coil inserting jig and head portion of the insulating material inserting device.
Figure 23:
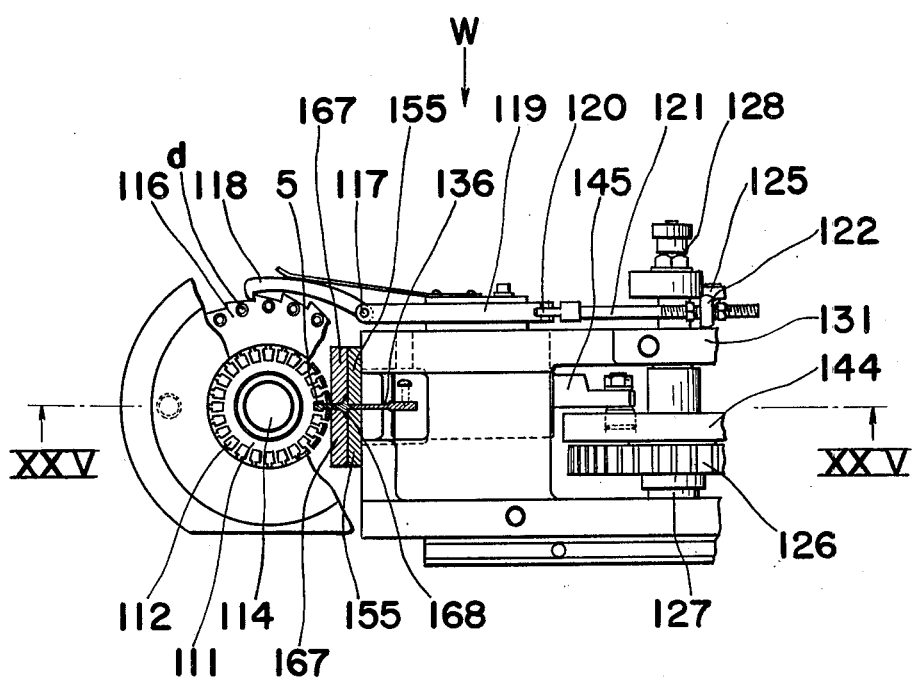
FIG. 23 is a top plan view showing an arrangement for driving the head portion of the insulating material inserting device of FIG. 22.
Figure 24:
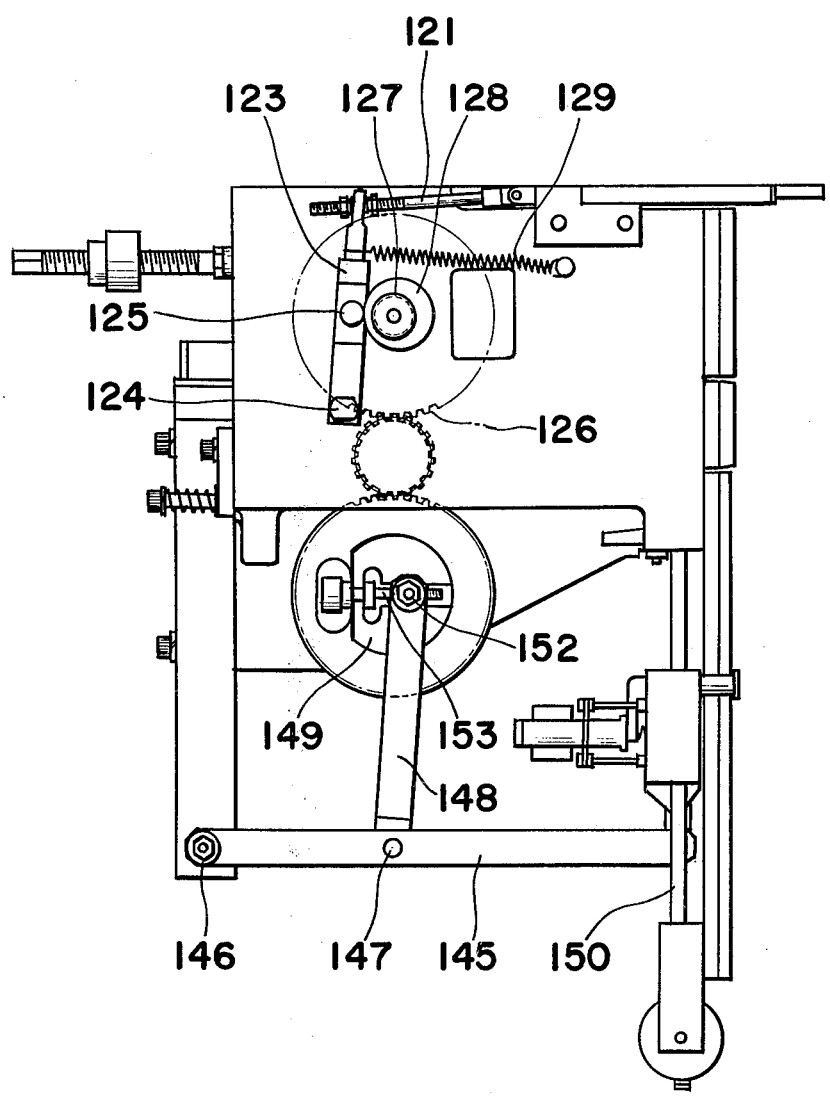
FIG. 24 is a front elevational view as observed in a direction of the arrow W in FIG. 23.
Figure 25:
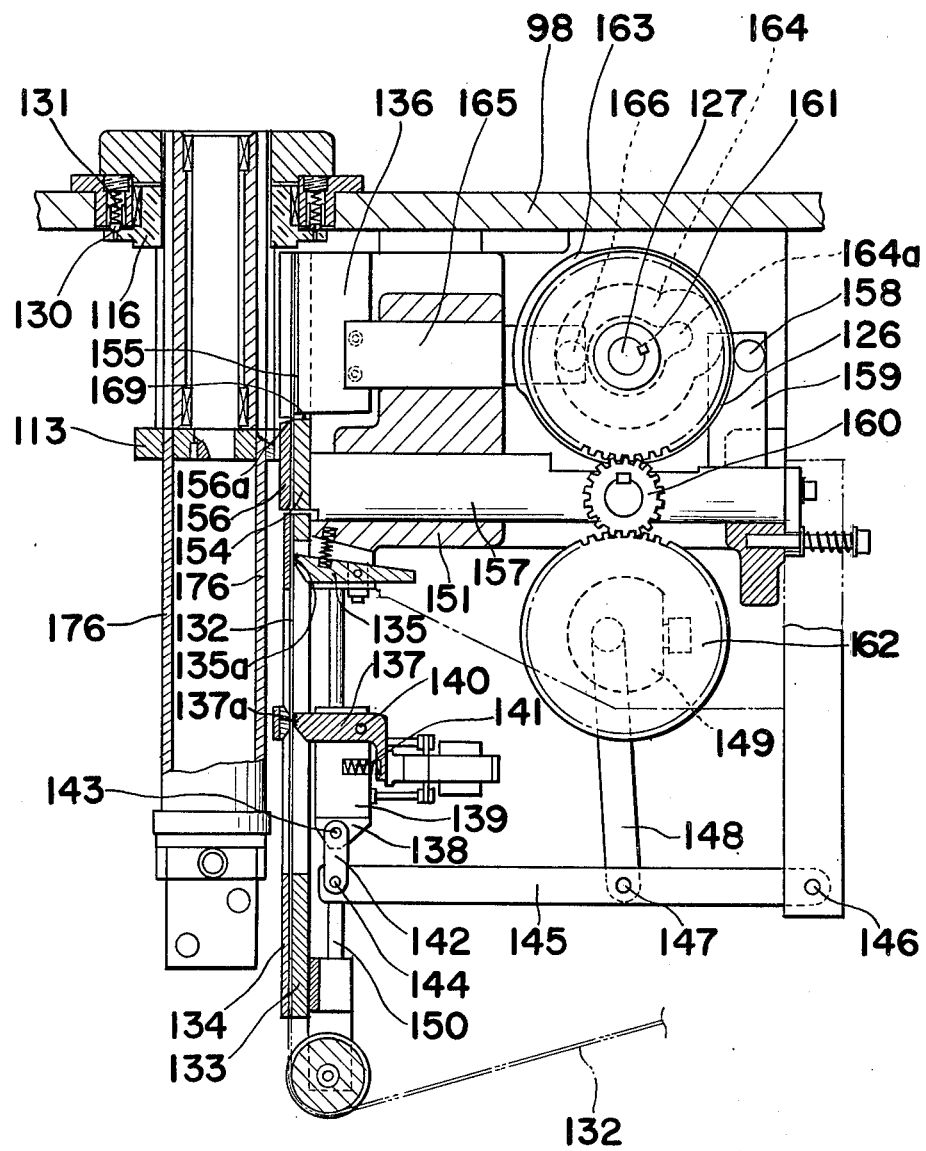
FIG. 25 is a cross sectional view taken along the line XXV—XXV of FIG. 23.

By the above arrangement, the coil inserting jig 6 guided by the guides 80 and 109 and transported by the chains 31 is stopped when projection 81a on the stop plate 81 is projected into the path thereof, and thereafter, when the rod 89a of the hydraulic cylinder 89 (FIG. 20) is advanced, whereby the regulating member 86 is caused to be advanced through the joint 90. Following the advancing of the regulating member 86, the rack 92 having the roller 93 (FIG. 20) secured thereto and engaging the cam groove of the regulating member 86 is moved in the directions of the arrow U (FIG. 19). The gears 94 in mesh with the rack 92 are rotated in the direction of the arrow V (FIG. 19) and cause the cam shafts 100 to rotate in the direction opposite to that of the arrow V through the gears 95. The rollers 108 on the levers 105 initially contacting the bottom of the cams 104 are moved onto the top of the cams 104 due to the rotation of the cam shafts 100 in the direction of the arrow V, and thus the under surface of the upper pallet 11 of the coil inserting jig 6 contacting the upper surface of the rollers 108 is pushed up, with consequent raising of the jig 6 above the upper surface of the chains 31. Upon contact of the rollers 108 of the levers 105 with the top portions of the cams, the levers 105 are brought into a locked state and support the jig 6 in the upwardly raised state. Upon further advancing of the regulating member 86, the V-shaped projection of the regulating member 86 is brought into engagement with the V-shaped groove of the pallet 10 of the coil inserting jig 6 for pressing the pallet 10 against a cover plate 110 secured to the guide 109 (FIG. 21). It is to be noted here that insulating material guide grooves 112 (FIGS. 22 and 23) extending parallel to the axes of and equidistantly spaced around the outer periphery of a guide housing 111 are equal in number to and aligned with the insulating material guiding slots 28 of the coil inserting jig 6 for example twenty-four slots 28 being provided in the insulating material guide 8 and twenty-four insulating material guide grooves 112 also being provided and being aligned with corresponding ones of the slots 28. The guide housing 111 extend between the stationary plate 98 and support plate 113 and is rotatable on bearings 115 about a shaft 114 (FIG. 22). A ratchet wheel 116 a number of teeth equal to the number of guide grooves 112 is secured to the guide housing 111, and a pawl member 118 pivotable about a pin 117 has the free end thereof engaged with the teeth of the ratchet 116. The other end of the pawl member 118 is connected to one end of a sliding member 119, and the other end of the sliding member 119 is connected to a link rod 121 by a pin 120 (FIG. 23). Further connected to the link rod 121 by a spherical bearing portion 122 is a lever 123 pivotable about a pin 124, with a roller 125 rotatably mounted at approximately the central portion of the lever 123. An eccentric cam 128 is fixed to a shaft 127 to which a gear 126 is secured, and the roller 125 of the lever 123 is urged into contact with the eccentric cam 128 by the force of a spring 129 connected at its one end to the lever 123 and at its other end to a pin secured to a frame of the apparatus (FIG. 24). Upon rotation of the shaft 127, the eccentric cam 128 subjects the lever 123 to pivotal movement through the roller 125, with consequent pivotal movement of the link rod 121, and reciprocation of the sliding member 119, whereby the ratchet wheel 116 is rotated clockwise in FIG. 23, and the pawl member 118 is again restored to a position of engagement with the teeth of the ratchet wheel 116. For retaining the ratchet wheel 116 in position, counter sinks or detent recesses d equal in number to the number of the teeth are formed in the ratchet wheel 116 at equidistant intervals around the side face thereof as is most clearly seen in FIGS. 23 and 25 for engagement with a steel ball 130 or the like urged towards the detent recesses d, for example, by a spring 131. For feeding tape-like insulating material 132 from a reel into a cutting and shaping device, there is provided a groove-shaped guide 133 (FIG. 25) which has a cover plate 134 for fitting the insulating material correctly into the groove-shaped guide 133. There is also provided a claw member 135 pivotally connected to the frame of the apparatus and having at its forward end a blade portion 135a which contacts the insulating material 132. The claw member 135 is shaped so as to permit the insulating material to advance towards a shaping and push-in punch 136, but to prevent the same from moving in the opposite direction. For feeding the insulating material of a predetermined length into the shaping and push-in punch 136, there is provided a feeding claw 137 having a tooth portion 137a. As is shown in FIG. 25, the claw 137 is pivotally connected by a pin 140 to the inside of a slot 139 formed in a feeding block 138. In the feeding block 138 there is housed a spring 141 for urging the feeding claw 137 to pivot counter-clockwise to contact the insulating material 132. Since the feeding claw 137 is urged by the spring 141 as described above, the tooth portion 137a of the claw 137 contacts the insulating material 132, and upon movement of the claw 137 towards the shaping and push-in punch 136, the insulating material 132 is advanced. When the feeding claw 137 is moved in a direction away from the punch 136, said claw 137 is rotated clockwise to a certain extent about the pin 140, in which case, the pressure applied to the insulating material 132 by the tooth portion 137a is not very large. Some downward driving force is applied to the insulating material 132 in this case, but any downward movement thereof is prevented by the presence of the rotary claw 135.

In FIG. 25, for subjecting the feeding claw 137 to periodic vertical reciprocation, a link 142 is connected to the feeding block 138 and one end of a lever 145 by pins 143 and 144 respectively. The other end of the lever 145 is rotatable about the pin 146, and a link 148 is pivotally connected at its one end to an intermediate portion of the lever 145 by a pin 147, with the other end of the link 148 being eccentrically connected to a rotary wheel 149. Upon rotation of the rotary wheel 149, the link 148 is reciprocated vertically, and consequently the feeding block 138 and feeding claw 137 are selectively moved toward and away from the shaping and push-in punch 136. For maintaining the vertical reciprocating movements of the feeding block 138 and feeding claw 137 in a proper relation with respect to the groove-shaped guide 133 and insulating material 132, a guide shaft 150 is provided which extends parallel with the groove-shaped guide 114. The upper end of the guide shaft 150 is connected to a main body case 151, while the lower end thereof extends through an opening formed in the feeding block 138. When the feeding block 138 is subjected to the vertical reciprocating movement by the lever 145, the path of movement of the feeding block 138 is maintained in parallel relation to the groove-shaped guide 133 by the guide shaft 150, and thus the insulating material is fed out properly at all times. A block connected by a pin 152 (FIG. 24) to the one end of the link 148 is connected by a threaded engagement with a bolt 153 to the wheel 149 and the center of the pin 152 can be moved away from the center of the rotary wheel 149, and the amount of eccentricity can be altered as desired by rotation of the threaded portion of the bolt 153. Accordingly, it is possible to alter the vertical stroke of movement of the feeding block 138 by variation of the angle of pivotal movement of the lever 145.

When the feeding claw 137 is moved towards the shaping and push-in punch 136, the insulating material 132 is fed into the guide 155. The rate of feeding may be varied depending on the thickness of the stator core by varying the vertical stroke of the feeding block 138 in a manner as described above.

Referring particularly to FIGS. 23 and 25, the means for cutting, molding and pushing in of the insulating material 132 will be described hereinbelow.

Included in these portions are a cutting block 156 having a guide for the insulating material 132 and a cutting blade 156a at its forward end, a shaft 157 secured to the cutting block 156 and slidable in and guided by the main body cam 151, a roller 158 on a support plate 159 which is fixed to the shaft 157, a gear 160 secured to an output shaft of a motor (not shown), a key 161 for securing a gear 126 to the shaft 127, another gear 162 secured to the rotary wheel 149, with the gear 160 being in mesh with the gears 126 and 162 for imparting rotation to the latter, a plate cam 163 fixed to the gear 126 for simultaneous rotation with the gear 126 upon clockwise rotation of said gear 126 so as to impart reciprocating movement to the shaft 157 through the support plate 159 having thereon the roller 158, a groove cam 164 secured to the shaft 127, a shaft 165 to which the shaping and push-in punch 136 is secured, a roller 166 on the shaft 165 and engaged in the grooved cam 164 so that upon rotation of the grooved cam 164, the projecting portion contacts the roller for shifting the shaft 165 to the left in the drawing, a pressing guide 167 (FIG. 23) for preventing the insulating material from rising during guiding, and a slot 168 which is defined between the guide 155 and pressing guide 167. Upon the upward movement of the feeding block 138, a predetermined length of the insulating material 132 is fed by the feeding claw 137, and thereafter the shaping and push-in punch 136 is moved to the left by rotation of the grooved cam 164. In this case, since a cutting blade 169 is provided at the lower portion of the punch 136, the insulating material is cut when the punch 136 moves leftward with simultaneous movement of the cutting block 156 to the right in the drawing. Even after the cutting, the punch 136 is moved leftward, and after shaping the insulating material 132 and inserting the same into the guide groove 112 (FIG. 28) of the guide housing 111, the punch 136 is moved to the right. At the end of the movement the punch 136 is located to the right beyond the guide surface of the guide 155 for the insulating material 132.

After the feeding of the insulating material 132 in the above described manner and inserting the insertion of the same, through cutting and shaping, into one of the guide grooves 112 of the guide housing 111, the ratchet wheel 116 (FIG. 23) is rotated by one pitch. Again the insulating material 132 is inserted into the subsequent one of the guide grooves 112 by cutting and shaping, and such procedure is subsequently repeated, the insulating material being inserted into the plurality of guide grooves 112. For reducing the time required for inserting a plurality of insulating material pieces 5 into the guide grooves 112 of the guide housing 111, a method of inserting such insulating material pieces 5 by cutting and shaping thereof at two positions spaced 180° around the guide housing 111 will be described hereinbelow.

Figure 26:
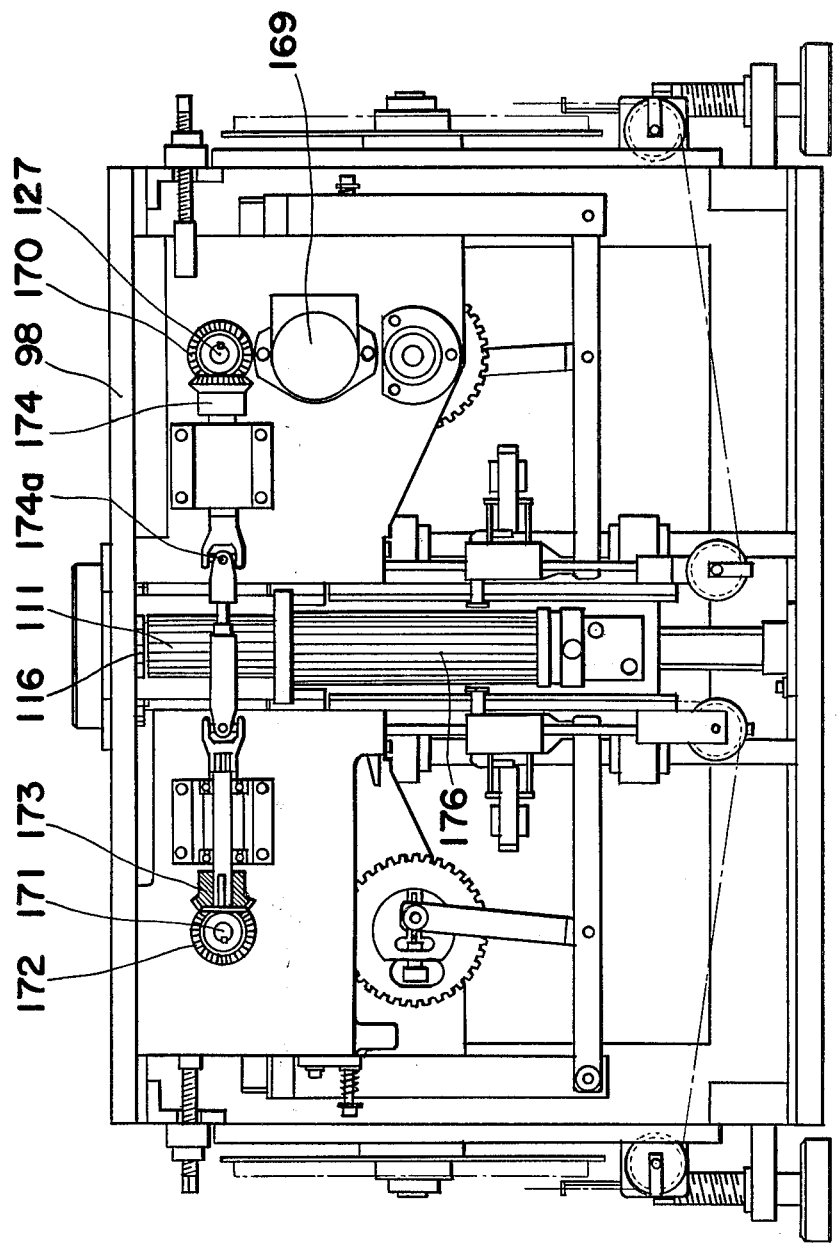
FIG. 26 is a front elevational view showing the entire lower portion of the insulating material inserting station F, with the coil inserting jig removed.
Figure 27:
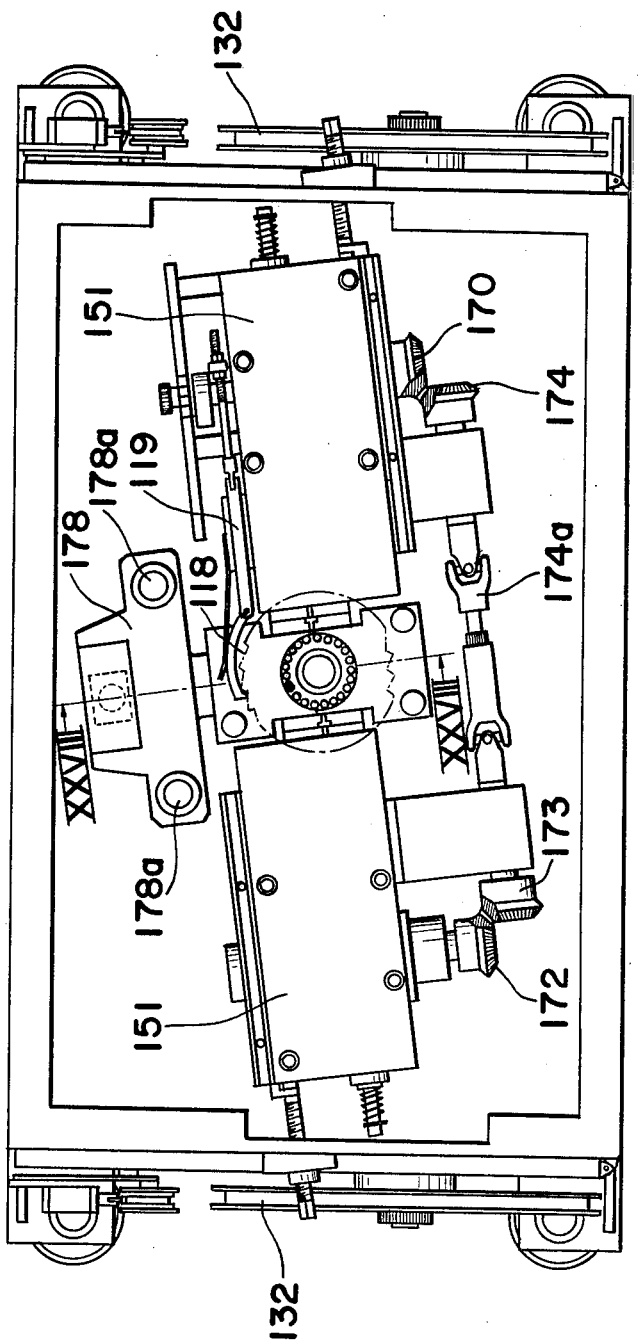
FIG. 27 is a top plan view of the portion shown in FIG. 26.
Figure 28:
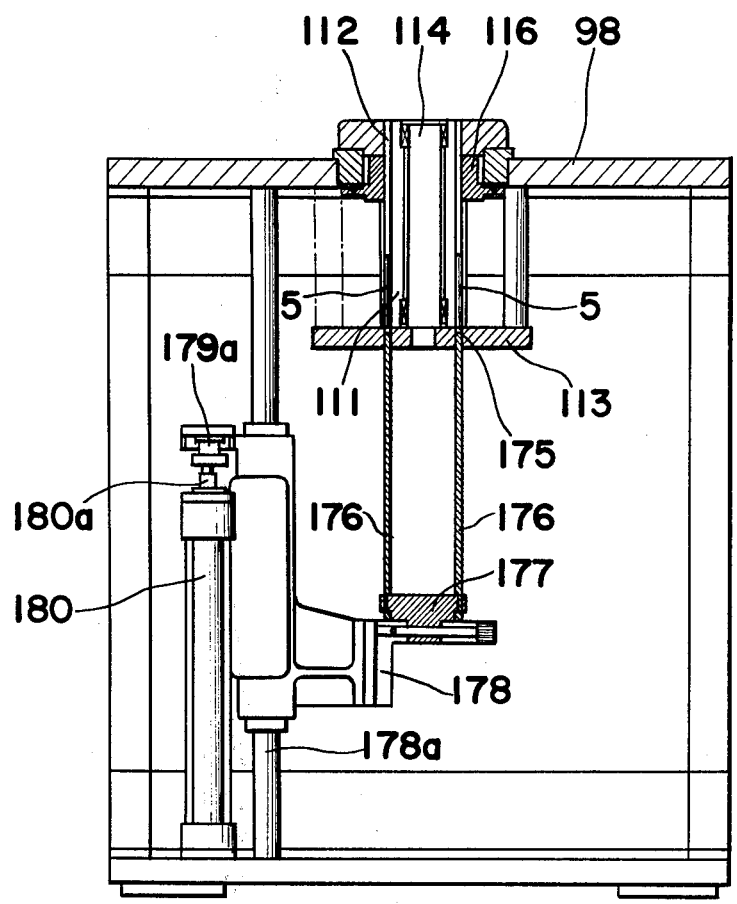
FIG. 28 is a cross sectional view taken along the line XXVIII—XXVIII of FIG. 27.

Referring to FIGS. 26 and 27 the means described above for feeding the insulating material into the shaping and push-in punch 136 to cut, shape and insert the same into the guide grooves 112 of the guide housing 111 is provided on a stationary plate 98 (FIG. 28) at two positions spaced around the periphery 180° of the guide housing 111. On one side the means having the driving mechanism of the ratchet wheel 116 described earlier is provided, while on the other side, a means without such a ratchet wheel feeding mechanism is provided (FIG. 26). To the means having the driving mechanism including the ratchet wheel 116 is coupled a driving motor 169, with the gear 160 (FIG. 25) secured thereto. At one end of the shaft 127 to which the gear 126 engaging the gear 160 is secured, a bevel gear 170 is fixed. On the cam shaft 171 of the other means is secured a bevel gear 172, with the two means being coupled to each other for synchronized operation by bevel gears 173 and 174 and a shaft coupling 174a.

A description will now be given of a procedure for insertion into the insulating material guide slot 28 of the coil inserting jig 6 after the plurality of insulating material pieces 5 have been inserted into the insulating material guide grooves 112 of the guide housing 111.

The support plate 113 (FIG. 28) has a plurality of openings 175 positionally corresponding to the insulating material guide grooves 112 and guide slots 28, and a plurality of elongated insulating material pushing members 176 having a configuration similar to that of the guide grooves 112 for inserting the insulating material pieces 5 accommodated in the guide grooves 112 of the guide housing 111 into the lower end portions of the guide slots 28 in the coil inserting jig 6 are provided. The insulating material pushing members 176 are fixed on a support plate 177 and equidistantly spaced therearound so as to be axially aligned with the insulating material guide grooves 112 of the coil inserting jig 6, with the forward ends of the members 176 being positioned below the upper surface of the support plate. The support plate 177 is threadedly fastened to a movable member 178, and the movable member 178 is provided with an opening in which a guide shaft 178a is slidably received and is coupled to a rod 180a of a hydraulic cylinder 180 by a coupling 179a.

For inserting the insulating material pieces 5 into the lower portion of the insulating material guide grooves 28 of the coil inserting jig 6, the rod 180a of the cylinder 180 is preliminarily advanced a predetermined distance, and the insulating material pieces 5 are pushed up by the insulating material pushing members 176 for being inserted. Subsequently, the pushing members 176 are returned to the original position upon retraction of the rod 180a, and thereafter, upon retraction of the rod 89a of the hydraulic cylinder 89 of the position regulating device (FIGS. 19, 20 and 21), the coil inserting jig 6 rides on the chains 31 as described earlier in the explanation for the insulating material inserting station F, and when the solenoid 84 is operated, the projecting piece 81a is retracted, and the inserting jig 6 is transported to the coil inserting station G by the conveyor H.

Referring to FIGS. 29 to 35, the construction of the coil inserting station G will be described hereinbelow.

At the station G, the coil inserting jig 6 is also subjected to positional regulation in a manner similar to that at the insulating material inserting station F described earlier. Below the coil inserting jig 6 (FIG. 29), there is disposed a housing 181 having guide grooves 183 equidistantly spaced around the periphery and extending parallel to the axial direction for guiding the insulating material pushing members 182. For example, if twenty-four insulating material guide grooves 28 are provided, twenty-four-guiding grooves 183 are also provided in alignment with the guide grooves 28. The station G further includes a flange 184 engaging the housing 181, with the housing being secured by a pressing ring 185, a support plate 186 to which the flange 184 is fixed, bearings 187 housed in the housing 181 for guiding the coil push-up rod 28a, another support plate 188 having grooves for holding the lower portion of each of the insulating material pushing members 182 equidistantly spaced in the circumferential direction of the support plate and secured to the pushing members 182, the push-up rod 28a being fixed to the center of the support plate 188 (FIG. 30) and having a recess at its forward end portion for releasably engaging the coil pushing member 24 (FIG. 29) thereat, a movable guiding member 189 having a plurality of openings for guiding the intermediate portion of the insulating material pushing members 182, and also having at its central portion an opening 189a larger in diameter than the push-up rod and two openings in which slide bearings 190 are respectively housed and which extend parallel to the axis of the push-up rod 28a, guide shafts 191a each slidably supported by the slide bearings 190 and secured to the flange 184, a pushing plate 191 to which the support plate 188, slide bearings 192, one each at the right and left sides thereof, and also ball bearings 193, one at each side (FIG. 30), are secured, shafts 194 the opposite ends of which are fixed to the support plate 186 and lower face plate 195 for guiding the slide bearings 192 on the pushing plate 191, screw shafts 196 the upper ends of which are rotatably connected to the support plate 186 by bearings 197 and 198 and the lower ends of which are rotatably connected to the lower face plate 195 by bearings 199 and 200, receiving rings 201 each contacting the upper end of an inner ring of each of the bearings 200, sprockets 202 fixed to the screw shafts 196 for depressing rings 203 by pressing plates 204, a motor 205 mounted on the fixing base 206, with the output shaft thereof directed downward and a sprocket (not shown) fixed to the forward end of the output shaft, chains 207 connected to sprockets 202 at the lower portion of the screw shafts 196 and the sprocket secured to the output shaft of the motor 205, stop bolts 208 (only one shown in FIG. 30) which is threadedly connected to the lower surface of the pushing plate 191 for adjustment of the movement thereof, stop blocks 209 each contacted by the corresponding stop bolt 208 for stopping the pushing member 191, stop bolts 210 each threadedly connected to the upper surface of the pushing member 191 for stopping the pushing member 191 by contacting the support plate 186 during upward movement of the pushing member 191, and a main body 212 for supporting the support plate 186 and the lower face plate 195 in the upper and lower positions respectively. The station G further has a setting member 213 having a plurality of blades 214 (FIG. 32) formed by equally dividing the outer periphery thereof which engages the coil accommodating space 26 (FIG. 7) formed by the blades 7 of the coil inserting jig 6 for positional adjustment of the intervals between the blades 7, a shaft 215 which is guided by a stationary cylinder 216 for vertical sliding movement, with the stationary cylinder 216 being secured at right angles to the support plate 186 by a plate 216a, a bearing 218 housed in an arm 217 mounted on shaft 15, a shaft 219 secured to a plate 220 and on which the bearing 218 is guided, with the plate 220 holding the upper portion of the stationary cylinder 216 and the lower portion of the shaft 218, and an attaching portion 221 housed at the forward end of the arm 217. The shaft 215 is connected at its lower end to a rod 223 of a hydraulic cylinder (not shown) through a shaft coupling 222 for vertical sliding movement by reciprocation of the rod 223. Further included in the station G are a pressing plate 224 fixed to a pushing block 225 for contacting the upper surface of the stator, two rollers 226 each secured to the pushing block 225 by a shaft 227 in a direction at right angles to the pressing plate 224, and a cam plate 228 having a cam groove 229 the lower end of which is parallel to the insulating material guide 8 and the upper end of which has a rounded portion for contact with the roller 226 to allow the roller 226 to move along the cam face of the cam groove 229. A link 230 connected to the pushing block 225 and shaft 227 has one end connected to a lever 232 by a shaft 231. The other end of the lever 232 is connected to a shaft 233 which is fixed to the cam plate 228. The lever 232 is pivotable about the shaft 233, while the link 230 is also pivotable about the shafts 227 and 231. One end of a joint link 234 is connected to a central portion of the lever 232 by a shaft 235, while the other end of the link 234 is connected to a rod 236a of a hydraulic cylinder 236. The rear end of the cylinder 236 is connected to a support plate 238 by a shaft 237, and the support plate 238 fixed to the main body 240 and is provided with an opening through which the stationary cylinder 216 extends, a split ring portion being provided at a lower end portion of the opening for tightening the lower portion around the cylinder 216 by a bolt 211. Additionally, for directing the main body 240 in a predetermined direction, a shaft 242 is disposed parallel to the stationary cylinder 216 for allowing a concave groove in the main body 240 to slide over the outer periphery of the shaft 242. A bolt 243 threadedly engages the support plate 220 (FIG. 32) and the lower end of the bolt 243 is connected to a T-shaped groove formed in the main body 240. Upon rotation of the bolt 243, the main body 240 is slidable vertically.

The operation of the coil inserting station G will be described hereinbelow.

The coil inserting jig 6 is positioned in a similar manner to the positioning of the jig in the insulating material inserting station F described earlier, and in this state, a plurality of insulating material pieces 5 are accommodated in the slots 28 (FIG. 22) at the lower part of the coil inserting jig 6. The setting member 213 (FIG. 32) for keeping the blades 7 at equal intervals which is first mounted on the attaching portion 221 is standing-by above the coil inserting jig 6. Upon retraction of the rod 223 (FIG. 32) of a hydraulic cylinder (not shown), the attaching portion 221 descends to insert the setting member 213 into the blades 7. Subsequently, the attaching portion 221 releases the setting member 213 so as to leave the setting member 213 in the blades 7. Thereafter, the rod 223 of the hydraulic cylinder advances, and the attaching portion 221 again stands by above the coil inserting jig 6. In the next step, the stator core 1 is inserted into the insulating material guide 8 until the core 1 contacts a projection 8a formed on the guide 8, with teeth or grooved portion g (FIG. 3) of the stator core 1 being guided by corresponding grooves 245 (FIG. 9) of the blades 7. During insertion of the coil 4 and insulating material pieces 5 into the slots 3 of the stator core 1, the stator core 1 is raised away from the projection 8a by the contact of the coil with the side face of the slots 3. If the stator core moves away from the projection 8a during the above procedure, there is a disadvantage that the positions of the coil 4 and insulating material pieces 5 become improper for insertion into the slots 3. For avoiding such inconvenience as described above, it is necessary to axially fix the stator core during insertion of the coils, etc. Similarly, a sufficient space is required that will allow the stator core 1 not only to be pressed against the projection 8a of the insulating material guide 8, but to be readily inserted or withdrawn. In the coil inserting station G according to the present invention, the above procedure is effected in a manner as described hereinbelow.

Figure 30:
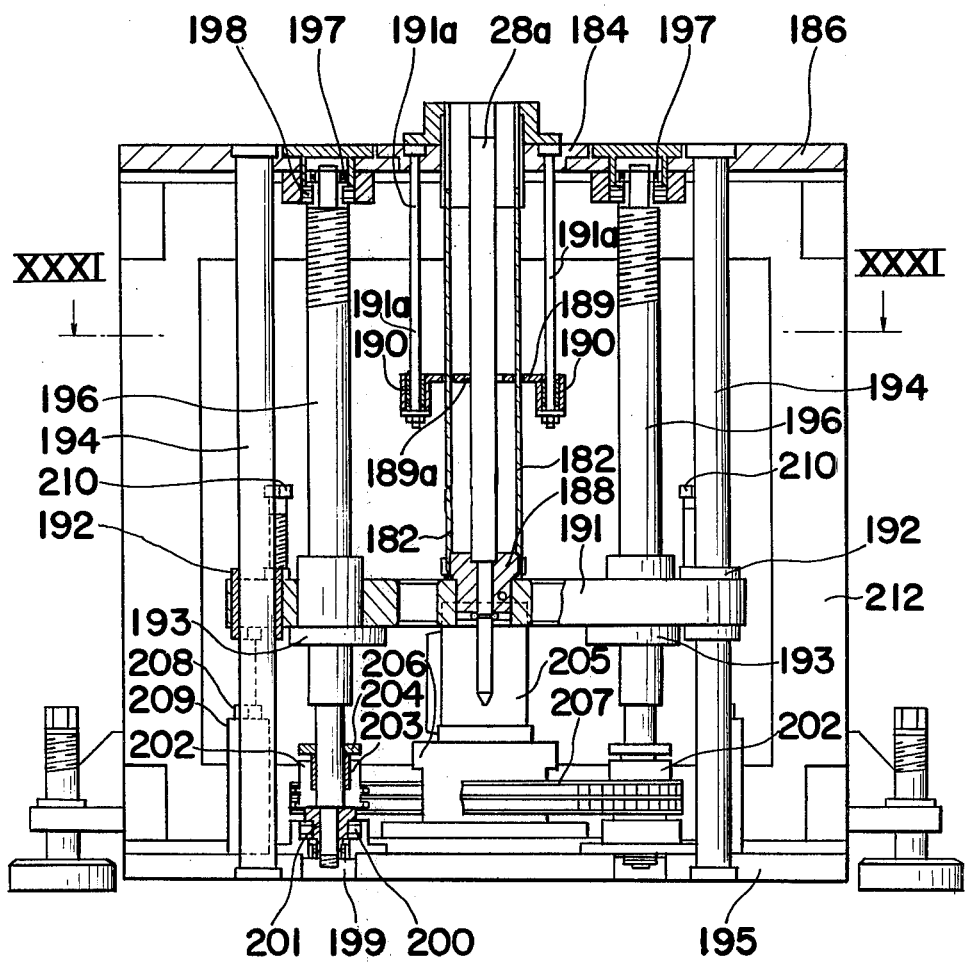
FIG. 30 is a front sectional view, partly in section, showing the entire lower portion at the coil inserting station G, with the coil inserting jig removed.
Figure 31:
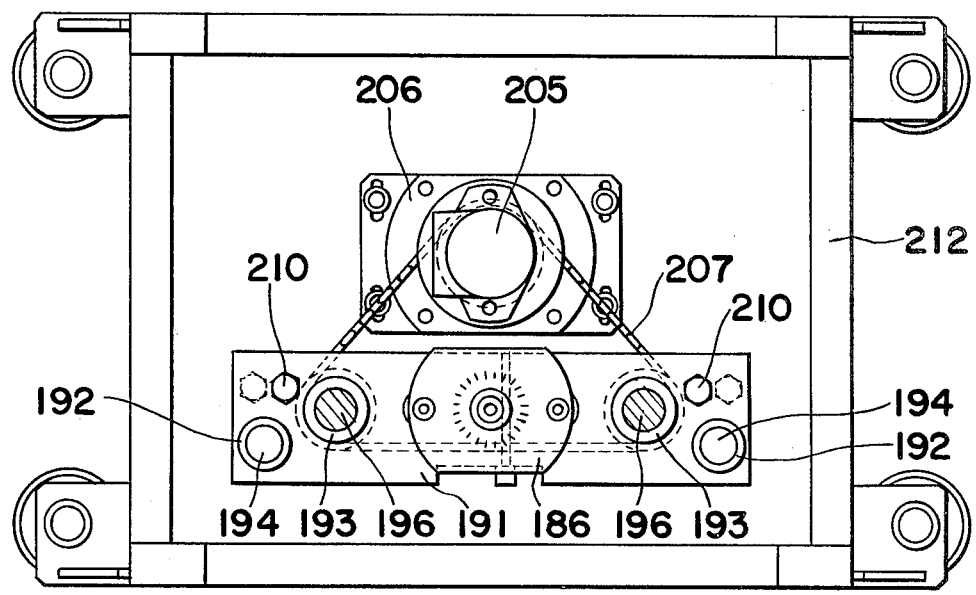
FIG. 31 is a sectional view taken along the line XXXI—XXXI of FIG. 30.
Figure 32:
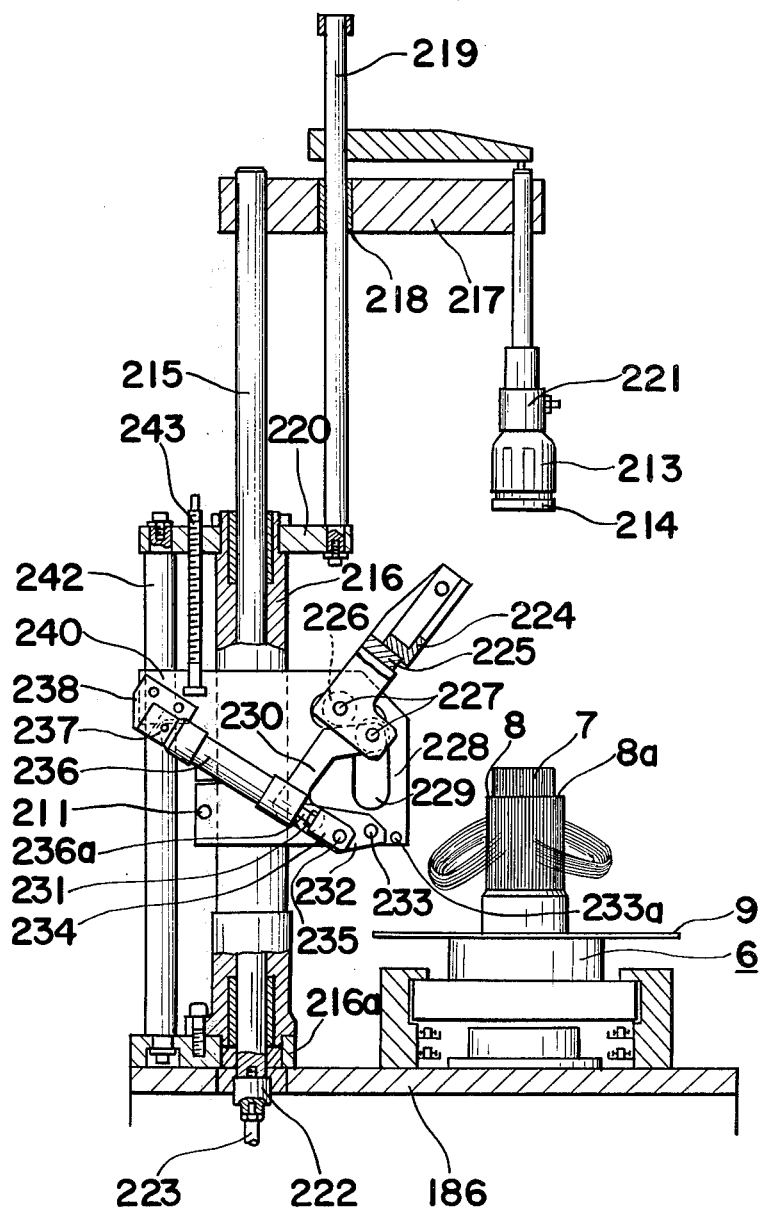
FIG. 32 is a front elevational view, partly in section, showing the entire upper portion of the coil inserting device at the coil inserting station G.
Figure 33:
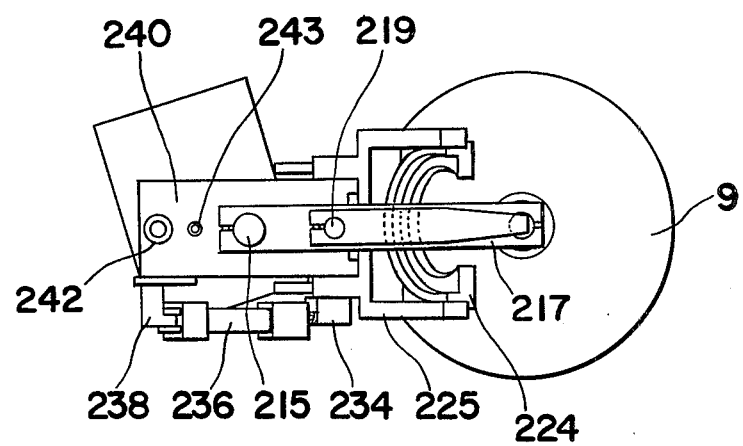
FIG. 33 is a top plan view showing a part of the portion shown in FIG. 32.
Figure 34:
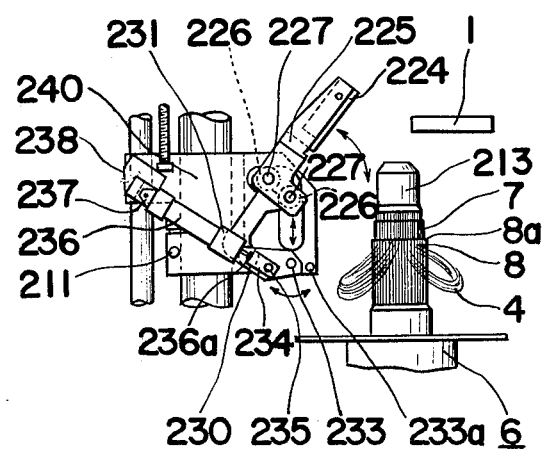
FIG. 34 is a front elevation view of the part of FIG. 33.
Figure 35:
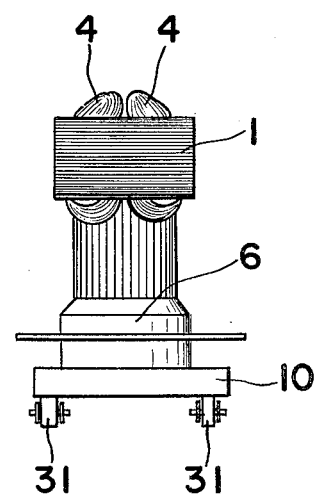
FIG. 35 is a front elevation view explanatory of insertion of a coil into an unfinished stator by the use of the coil inserting jig of the invention.

In FIG. 32, when the rod 236a of the cylinder 236 is advanced, the lever 232 is caused to pivot about the shaft 233 by the joint link 234. The pivotal movement of the lever 232 in turn causes the position of the shaft 231 at the lower end of the link 230 to move downward with respect to the shaft 227 and the position of the shaft 227 at the upper end of the link 230 moves downwards, with the roller 226 following the cam groove 229. As the upper one of the two rollers 226 on the pushing block 225 moves from the rounded portion of the cam groove 229 to the linear portion, the pressing plate 224 initially inclined to the axis of the insulating material guide 8 is moved to a position at right angles thereto and relation parallel relation to the upper surface of the stator. Upon further advancing of the rod 236a, the lever 232 contacts the stop pin 233a secured to the cam plate 228, and the movement of the rod 236a is interrupted. In this case, the two rollers 226 are located in the linear portion of the cam groove 229, and the surface of the pressing plate 224 contacts the upper surface of the stator in parallel relation to the latter. Subsequently, upon actuation of the motor 205, causing rotation of the screw shafts 196 and raising of the pushing member 191 as shown in FIG. 30, the push up rod 28a (FIG. 29) is raised simultaneously, and the coil pushing member 24 and push up rod 28a are coupled to the grip portion 27 in the coil pushing member 24 of the coil inserting jig 6. The height from the upper surface of the insulating material pushing member 182 to the upper surface of the coil pushing member 24 becomes constant, and they rise in a predetermined relation, as the pushing member 191 is raised. Upon further raising of the pushing member 191, the upper surface of the insulating material pushing member 182 contacts the under surface of the insulating material pieces 5 for moving them upward. The coil pushing member 24, movable blades 7b and insulating material pushing member 182 move in the direction of the axis of the stator 1, with their positional relation remaining unchanged, and the movable blades 7b secured to the coil pushing member 24 are located above the fixed blades 7a. The pushing member 191 stops with the upper surface of the coil spring member 24 located above the upper surface of the stator 1. In this case, the coil pushing member 24 completes insertion of the coil 4 into the slots 3 of the stator 1 in the axial direction, and the insulating material pushing member 182 completes insertion of the insulating material pieces 5 into the slots 3 of the stator 1. Meanwhile, the setting member 213 located at the upper end of the movable blades 7b is attached to the attaching portion 221.

Subsequently, the pushing member 191 is lowered by reverse rotation of the motor 205, and after the coil pushing rod 28a and insulating material pushing member 182 have been returned to the original position, the pressing plate 224 is spaced from the upper surface of the stator 1, and thereafter, the stator 1 with the coils inserted therein is removed from the coil inserting jig 6 by manual operation.

Upon completion of insertion of the coils 4 and insulating material pieces 5 into the stator 1, the rod 89a of the hydraulic cylinder 89 for regulating the position of the coil inserting jig 6 is retracted in the manner described with reference to FIGS. 19, 20 and 21, and consequently, the coil inserting jig 6 is lowered onto the chains 31, and carried out by the conveyor H to the stand-by station A upon retraction of the projection 81a by the solenoid 85.

Figure 36:
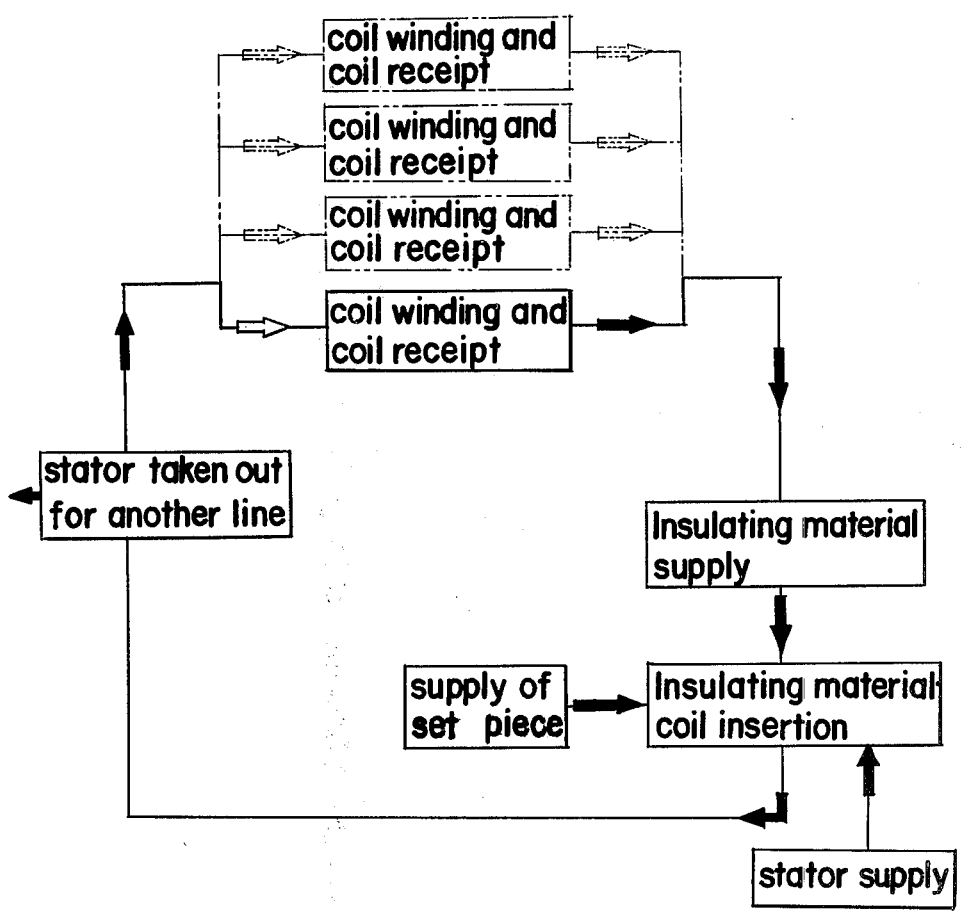
FIG. 36 is a flow chart explanatory of one embodiment of the method according to the present invention.

Referring to FIG. 36 showing a flow chart of the arrangement according to the present invention, the following advantages are obtained.

(i) By forming the coil winding device in one unit, it is possible to provide a plurality of winding devices in parallel in the longitudinal direction of the conveyor.

(ii) In the coil inserting device, if a coil insertion and withdrawal robot or the like is provided, the stator can automatically be inserted or withdrawn. It is also possible to effect withdrawal of the coils on the conveyors I or J after the coil inserting device.

(iii) Since the process for inserting the insulating material pieces in the lower part of the coil inserting jig has only to be completed before the process related to the coil inserting device, it is possible to install the means for carrying out such process along a part of the conveyor ahead of the coil inserting device and after the coil winding device or in the coil winding process.

As is clear from the foregoing description, according to the present invention, the following effects can be achieved.

(a) When trouble or failure in the operation device occurs or replenishment of the supply of wire material is necessary, winding of coils can still be; carried out by separate winding devices arranged in parallel without shutting down the whole production line.

(b) Production planning can be carried out for a wide range of production, since the number of the winding devices can be increased or decreased as desired.

(c) By rotating the blades every time a winding of a coil equivalent to one pole is received from the coil winding device, it is possible to wind coils having multi-poles by the same winding device, thus enabling efficient change-over for changing the type of product to be produced.

(d) By making the coil inserting jig a pallet type, the jig can readily be taken off the conveying device, while providing a key and key way for regulating rotation of the blades prevents the blades from rotating during transportation of the coil inserting jig, thus making it possible to transport the coil inserting jig in the state for receiving the coils within the blades 7.

(e) Since the insulating material pieces are arranged to be inserted at several places, not only the is the time for the entire assembly improved, but insulating pieces of different materials can be inserted simultaneously.

(f) By arranging the pressing plate for the stator core so it can move in a direction parallel to the axis of the insulating material guide for engaging the stator core, the load acting on the insulating material guide in the absence of clearance between the pressing plate and stator core is only in the axial direction, and thus the possibility of deforming the insulating material guide in a direction normal to the axial direction is eliminated.

(g) The arrangement for transporting the coil inserting jig by placing it on the upper surface of the driven chains with which it is engaged by friction makes it unnecessary to cause the coil inserting jig to move by itself, with consequent reduction of the complexity of the construction, less operating difficulties and reduction in cost.

(h) By changing direction of transportation of the coil inserting jig by raising the jig above the surface of the chains, any influence due to thrust by the chain is eliminated, with consequent stable transportation of the jigs.

(i) Since the carrying of the coil inserting jig into the coil winding device and carrying of the same jig out of the coil winding device are effected simultaneously, the time for transportation is reduced, resulting in increased working efficiency of the coil winding device.

(j) The arrangement for simultaneously effecting the raising and positional regulation of the coil inserting jig mechanically by a single driving makes it possible not only to improve the time, but to facilitate control of the apparatus.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

We claim:

1. An apparatus for manufacturing stators of electrical machines and the like which comprises:
   a plurality of coil inserting jigs;
   a jig transporting means having a plurality of coil receiving portions for transporting said jigs in parallel and a further portion for receiving said jigs from said coil receiving portions and transporting them in series;
   a plurality of coil winding means, one along each of said coil receiving portions of said jig transporting means for winding coils and placing them on said jigs;
   an insulating material inserting means at a position along said further portion of said jig transporting means for inserting insulating material into said coil inserting jigs; and
   a coil inserting means at a position along said further portion of said jig transporting means downstream of said inserting means for inserting the coils and pieces of insulating material from said jigs into stator cores.

2. An apparatus as claimed in claim 1, wherein said coil winding means comprises means for placing the wound coils onto said coil inserting jigs in position corresponding to the poles of the stator so as to sequentially wind a plurality of poles, said coil inserting jigs having spaced blades for receiving the wound coils and pallets on which said blades are rotatably supported.

3. An apparatus as claimed in claim 12, wherein said coil inserting jigs each have a pallet having therein a V-shaped groove, and said coil winding means, said coil inserting means and insulating material inserting means each have a setting member engagable in said groove for holding the jig at a position corresponding to the position of the setting member; said pallets each having a disc member on which said blades are secured, a counter sink portion rotatably supporting said disc member, a plurality of key ways provided in the outer periphery of said disc member, and a key engagable in said key ways, said key being disengaged from the key ways to permit rotation of said disc member and being engaged with said key ways after the rotation of said disc member for positioning the disc member at the desired rotational position.

4. An apparatus as claimed in claim 1, wherein said insulating material inserting means has a guide housing for storing a plurality of pieces of the insulating material and an insulating material piece-shaping and pushing-in punch for simultaneously inserting said plurality of insulating material pieces at several places in said jigs.

5. An apparatus as claimed in claim 4, wherein said jig transporting means comprises movable chains on which the lower ends of said coil inserting jigs are supported for transporting said jigs, and said insulating material inserting means comprises a projection for stopping said coil inserting jigs; means on which said projection is mounted for selectively moving said projection into and out of the path of the jigs above the upper surface of said chains, a rotatable lever below said chains and having a roller thereon for contacting the lower ends of coil inserting jigs and a cam roller thereon, a rotatable shaft having a cam thereon contacting said cam roller and having a gear thereon, a slidable rack having teeth engaging said gear and a further roller attached to the central portion of said rack, a setting member having a cam groove in the under surface thereon in which said further roller is engaged and also having a V-shaped portion at a forward end thereof, and means connected to said setting member for selectively advancing and retracting said setting member, said setting member, upon advancing, causing said lever to pivot to raise said coil inserting jigs, and said V-shaped portion of said setting member engaging in a corresponding V-shaped recess in a jig for regulating the position of the coil inserting jig.

6. The apparatus as claimed in claim 1, wherein said coil inserting jigs each have insulating material guides therein for having inserted thereinto by said insulating material inserting means insulating material for insertion into a stator, and said coil inserting means has a member with a cam groove therein having at a lower end a portion parallel to the insulating material guides of said coil inserting jigs and having at an upper end a groove with a rounded portion, and a pressing plate on said member having rollers thereon movable in said cam groove for reciprocating said pressing plate along said cam groove for depressing a stator core on a coil inserting jig.

7. An apparatus as claimed in claim 1, in which said jig transporting means comprises a pair of endless chains movable along the respective portions and with which said coil inserting jigs are in frictional engagement for transporting said coil inserting jigs.

8. An apparatus as claimed in claim 1, in which said jig transporting means comprises movable chains on which the lower ends of said coil inserting jigs are supported for transporting said jigs, an elevating plate means having a contact portion movable into and out of the path of the jigs for stopping the jigs during transportation thereof while the chains continue to move beneath the jigs, elevating means on which said plate is mounted for selectively moving said plate between a position below the upper surface of said chains and above said upper surface, a pushing member reciprocating across the upper surface of said chains in a direction normal to the direction of transporting movement of said chains, and means connected to said pushing member for causing said pushing member to reciprocate, whereby said coil inserting jigs are stopped by said contact portion and raised by said elevating plate and pushed by said pushing member for changing the direction of transporting of the jigs to a direction normal to the transporting movement of said chains.

9. An apparatus as claimed in claim 12, wherein said jig transporting means comprises movable chains on which the lower ends of said coil inserting jigs are supported for transporting said jigs, and said coil winding means comprises a stop pin and means for selectively moving said stop pin between two positions above and below the upper surface of said chains for stopping said coil inserting jigs during transportation thereof while said chains continue to move beneath the jigs, an elevating plate for engaging coil inserting jigs and elevating them above the upper surface of said chains, elevating means on which said plate is mounted for moving said elevating plate between a position below the upper surface of said chains and a position above the upper surface of said chains, and two claw members reciprocable across the path of said chains in a direction normal to the direction of the transporting movement of said chains and above said elevating plate, and means on which said chain members are mounted for causing said claw members to reciprocate for engaging the coil inserting jigs on said elevated plate and moving them into said coil winding device and removing them from said coil winding device.

10. A method of manufacturing stators of electrical machines and the like which comprises the steps of:
   transporting each of a plurality of coil inserting jigs carried on pallets along one of a plurality of parallel portions of a jig transporting means and winding coils at a position along each of said parallel portions and placing said coils on the coil inserting jigs;
   transporting each of said pallets with the jigs with the coils thereon from the respective parallel portions of said jig transporting means and in series along a further portion of said transporting means having only a single transporting path;
   inserting insulating material into the coil inserting jigs at an insulating material inserting station along said transporting means;
   inserting the coils and insulating material from each jig into a stator core at a stator assembly station along said further portion of said transporting means downstream of said insulating material inserting station; and
   transporting the pallets with the empty jigs thereon along said further portion of said transporting means downstream of said stator core assembly station and then into respective parallel portions of said jig transporting means for again having coils placed thereon.

* * * * *